United States Patent
Yukawa et al.

(10) Patent No.: US 7,875,682 B2
(45) Date of Patent: Jan. 25, 2011

(54) PROPYLENE BLOCK COPOLYMER AND PROCESS FOR PRODUCTION THEREOF

(75) Inventors: Kiyoshi Yukawa, Yokkaichi (JP); Takehiro Sagae, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 443 days.

(21) Appl. No.: 11/989,418

(22) PCT Filed: Jul. 28, 2006

(86) PCT No.: PCT/JP2006/314966

§ 371 (c)(1), (2), (4) Date: Jan. 25, 2008

(87) PCT Pub. No.: WO2007/013585

PCT Pub. Date: Feb. 1, 2007

(65) Prior Publication Data

US 2010/0144990 A1    Jun. 10, 2010

(30) Foreign Application Priority Data

Jul. 29, 2005  (JP) .............................. 2005-220319
Jul. 29, 2005  (JP) .............................. 2005-220327

(51) Int. Cl.
    *C08F 297/08*    (2006.01)
    *C08F 2/38*      (2006.01)
(52) U.S. Cl. ................... 525/323; 525/268; 525/270
(58) Field of Classification Search .............. 525/268, 525/270, 323
    See application file for complete search history.

(56) References Cited

U.S. PATENT DOCUMENTS 5,753,773 A    5/1998  Langhauser et al.

FOREIGN PATENT DOCUMENTS

| DE | 4317655 A1 | 12/1994 |
|---|---|---|
| EP | 1454931 A1 | 9/2004 |
| JP | 04-337308 | 11/1992 |
| JP | 05-202152 | 8/1993 |
| JP | 06-172414 | 6/1994 |
| JP | 06-206921 | 7/1994 |
| JP | 06-287257 | 10/1994 |
| JP | 07-286022 | 10/1995 |
| JP | 08-027237 | 1/1996 |
| JP | 10-219047 | 8/1998 |
| JP | 11-080298 | 3/1999 |
| JP | 11-228648 | 8/1999 |
| JP | 11-240929 | 9/1999 |
| JP | 11-349649 | 12/1999 |
| JP | 11-349650 | 12/1999 |
| JP | 2000-239462 | 9/2000 |
| JP | 2001-048944 | 2/2001 |
| JP | 2001-064335 | 3/2001 |
| JP | 2002-356526 | 12/2002 |
| JP | 2003-147159 | 5/2003 |

OTHER PUBLICATIONS

Supplemental European Search Report dated Oct. 6, 2009, issued on the corresponding European patent application No. 06 78 1876.5.

*Primary Examiner*—Fred M Teskin
(74) *Attorney, Agent, or Firm*—Edwards Angell Palmer & Dodge LLP

(57) ABSTRACT

Disclosed is a propylene block copolymer having excellent flexibility and impact resistance and showing a good polymer powder form. Also disclosed is a process for producing the copolymer. More specifically, the copolymer is a novel propylene block copolymer which satisfies a specific requirement and is produced by a process comprising continuously performing a multi-step polymerization composed of a former step in which a propylene homopolymer component or a specific propylene copolymer component is produced in the presence of a metallocene catalyst carried on a support and a latter step in which propylene and a specific copolymer component are produced by gas phase polymerization.

20 Claims, No Drawings

PROPYLENE BLOCK COPOLYMER AND PROCESS FOR PRODUCTION THEREOF

BACKGROUND OF THE INVENTION

1. Field of the Invention

The present invention relates to a novel propylene block copolymer and a process for production thereof, and more specifically relates to a novel propylene block copolymer with excellent flexibility or impact resistance, good antiblocking property without sticky feeling, less gel generation in molding, low coefficient of linear expansion, and good polymer powder form, obtained by using a metallocene catalyst supported on a carrier, and a process for production thereof stably and efficiently.

2. Description of the Prior Art

Crystalline polypropylene is widely used in various molding fields because it is excellent in mechanical property, chemical resistance or the like. However, when a propylene homopolymer, or a random copolymer with a small amount of an α-olefin is used as the crystalline polypropylene, stiffness is high, but impact resistance is insufficient. Thus improvement of impact resistance has been carried out by a method for adding elastomer such as ethylene-propylene rubber or the like to a propylene homopolymer or a random copolymer; or a method in which after homopolymerization of propylene or random copolymerization with a small amount of an α-olefin, propylene is subsequently copolymerized with ethylene or an α-olefin to produce a so-called block copolymer. Furthermore, it is known that by increasing amount of a rubber part of this block copolymer, a propylene block copolymer with improved flexibility or impact resistance can be obtained.

In addition, as a different problem from this, a low molecular weight component (an oligomer or the like) always presents, due to property of the catalyst, in a propylene block copolymer obtained by polymerization in the presence of a conventional Ziegler-Natta type catalyst. Recently, in particular, there is a tendency to more improve moldability of the resultant propylene block copolymer by increasing fluidity. However, it is known that too much increase in fluidity as for the rubber component results in increase in also generation ratio of a low molecular weight component therewith, and this low molecular weight component not only causes various problems such as generation of smoke, malodor or the like in molding, but also gives bad effect on odor or taste even after molding, or deterioration of antiblocking property caused by sticking or the like, and thus raised a problem of inhibiting stable production caused by deterioration of polymer powder form. On the other hand, it is also known that increase in difference between average molecular weight of crystalline polypropylene and that of a rubber part generates a problem of providing more gel in molding or making coefficient of linear expansion high.

On the other hand, it is known that an isotactic polypropylene can be obtained by polymerization of propylene using a metallocene type catalyst different from a conventional Ziegler-Natta type catalyst. In addition, it is also known that a so-called a block copolymer is produced by homopolymerization of propylene by using a similar catalyst and subsequently by copolymerization of ethylene and propylene (for example, see Patent Document 1 to 5). In addition, a process is disclosed for producing a block copolymer, wherein a copolymer of ethylene and propylene is produced in a former step, and homopolymerization of propylene is carried out in a latter step (for example, see Patent Document 6).

Furthermore, a propylene-ethylene block copolymer having good stiffness and impact resistance (for example, see Patent Document 7 to 10) is disclosed. Still further, a propylene resin composition excellent in flexibility or transparency, and that without sticky feeling (for example, see Patent Document 11 and 12) is disclosed.

However, according to the above proposals, though stiffness and impact resistance are further improved, amount of a copolymer of propylene and ethylene or an α-olefin, or a comonomer composition of the copolymer, which furnishes flexibility or impact resistance, has not yet reached a satisfactory level, and thus improvement is desired, and also, development of a process for production to stably produce a propylene block copolymer having such a satisfactory level has been desired. As far as the present inventors know, there have been no examples of producing such a propylene copolymer by using a metallocene catalyst supported on a carrier, and by carrying out the latter step for polymerization of a rubber part, in gas phase polymerization.

Patent Document 1: JP-A-4-337308

Patent Document 2: JP-A-6-287257

Patent Document 3: JP-A-5-202152

Patent Document 4: JP-A-6-206921

Patent Document 5: JP-A-10-219047

Patent Document 6: JP-A-8-27237

Patent Document 7: JP-A-11-228648

Patent Document 8: JP-A-11-240929

Patent Document 9: JP-A-11-349649

Patent Document 10: JP-A-11-349650

Patent Document 11: JP-A-2000-239462

Patent Document 12: JP-A-2001-64335

SUMMARY OF THE INVENTION

In view of the above conventional technology, it is an object of the present invention to provide a novel propylene block copolymer with excellent flexibility or impact resistance, good antiblocking property without sticky feeling, less gel generation in molding, low coefficient of linear expansion, little flow mark generation, and good polymer powder form, obtained by using a metallocene catalyst supported on a carrier, and a process for production thereof stably and efficiently.

The present inventors have extensively studied a way to solve such problems and, as a result, found that a novel propylene block copolymer with excellent flexibility or impact resistance, good antiblocking property without sticky feeling, less gel generation in molding, low coefficient of linear expansion, and good polymer powder form can be obtained, in a propylene block copolymer obtained by a multi-step polymerization using a metallocene catalyst supported on a carrier, by setting content of a copolymer component composed of propylene and ethylene or an α-olefin at higher value than a specified numerical value, by setting polymerization ratio of a comonomer in the copolymer component at higher value than a specified numerical value, by setting weight average molecular weight of the copolymer component within a specified numerical value range, and further by setting amount ratio of a component with a molecular weight of equal to or lower than 5000 at equal to or lower than a specified numerical value, and also, the above novel propylene block copolymer with excellent flexibility or impact resistance, good antiblocking property without sticky feeling, less gel generation in molding, low coefficient of linear expansion, and good polymer powder form can be stably and efficiently produced, by controlling average particle diameter of the propylene homopolymer component or the propylene-α-olefin copolymer component obtained in the former step within a specified range, and by carrying out polymerization of a copolymer of propylene and ethylene or an α-olefin, in the latter step, in gas phase polymerization, and have thus completed the present invention.

Namely, according to a first aspect of the present invention, a propylene block copolymer obtainable by a multi-step polymerization in the presence of a metallocene catalyst supported on a carrier comprising:

a former step for producing a propylene homopolymer component, or a propylene copolymer component (hereafter referred to as PP) composed of propylene and at least one kind of a comonomer selected from the group consisting of ethylene and/or a $C_{4-20}$ α-olefin, wherein content of the comonomer being equal to or less than 10% by weight; and a latter step for producing a copolymer component (hereafter referred to as CP) composed of propylene and at least one kind of a comonomer selected from the group consisting of ethylene and/or a $C_{4-20}$ α-olefin, characterized by satisfying the following requisites (1) to (4):

Requisite (1): Content of CP in the propylene block copolymer is from 45 to 99% by weight.

Requisite (2): Polymerization ratio of the comonomer in CP is from 30 to below 100% by mole.

Requisite (3): Weight average molecular weight of CP is from 100,000 to 2,000,000.

Requisite (4): Ratio of amount of a component with a molecular weight of equal to or less than 5000 (M≦45000), by measurement with gel permeation chromatography (GPC), is equal to or less than 2.0% by weight of the total is provided.

In addition, according to a second aspect of the present invention, the propylene block copolymer according to the first aspect, characterized in that bulk density (BD) is equal to or higher than 0.37 $g/cm^3$ (hereafter this characteristics is abbreviated as requisite (5)) is provided.

In addition, according to a third aspect of the present invention, the propylene block copolymer according to the first or the second aspect, wherein the CP content is from 50 to 80% by weight is provided.

In addition, according to a fourth aspect of the present invention, the propylene block copolymer according to any one of the first to the third aspects, wherein the ratio of the comonomer in CP is from 40 to 99% by mole is provided.

In addition, according to a fifth aspect of the present invention, the propylene block copolymer according to any one of the first to the fourth aspects, wherein the weight average molecular weight of CP is from 200,000 to 1,200,000 is provided.

In addition, according to a sixth aspect of the present invention, the propylene block copolymer according to any one of the first to the fifth aspects, wherein the comonomer used in CP is ethylene is provided.

In addition, according to a seventh aspect of the present invention, the propylene block copolymer according to any one of the first to the sixth aspects, wherein the PP is a propylene homopolymer component is provided.

In addition, according to an eighth aspect of the present invention, the propylene block copolymer according to any one of the first to the seventh aspects, wherein melting point of PP is equal to or higher than 157° C. is provided.

In addition, according to a ninth aspect of the present invention, a process for production of the propylene block copolymer according to anyone of the first to the eighth aspects, characterized in that:

the former step produces a propylene homopolymer component, or a propylene copolymer component (hereafter referred to as PP) composed of propylene and at least one kind of a comonomer selected from the group consisting of ethylene and/or a $C_{4-20}$ α-olefin, wherein content of the comonomer being equal to or less than 10% by weight, so that average particle diameter of the PP is equal to or larger than 700 μm; and subsequently the latter step produces, by gas phase polymerization, a copolymer component (hereafter referred to as CP) composed of propylene and at least one kind of a comonomer selected from the group consisting of ethylene and/or a $C_{4-20}$ α-olefin is provided.

In addition, according to a tenth aspect of the present invention, the process for production of the propylene block copolymer according to the ninth aspect, characterized in that the former step is carried out at a temperature of from 30 to 120° C., under a pressure of from 0.1 to 6 MPa, while the latter step is carried out at a temperature of from 30 to 120° C., under a pressure of from 0.1 to 5 MPa, is provided.

In addition, according to an eleventh aspect of the present invention, the process for production of the propylene block copolymer according to the ninth or the tenth aspects, characterized in that, in the former step, PP is produced so that average particle diameter thereof is equal to or larger than 1 mm, is provided.

In addition, according to a twelfth aspect of the present invention, the process for production of the propylene block copolymer according to any one of the ninth to the eleventh aspects, characterized in that the former step is carried out by gas phase polymerization, is provided.

In addition, according to a thirteenth aspect of the present invention, the process for production of the propylene block copolymer according to any one of the ninth to the twelfth aspects, characterized in that the latter step is carried out in the co-presence of an electron-donating compound, is provided.

In addition, according to a fourteenth aspect of the present invention, the process for production of the propylene block copolymer according to any one of the ninth to the thirteenth aspects, characterized in that the latter step is carried out in the co-presence of an organoaluminum compound in addition to the electron-donating compound, and amount of the electron-donating compound is in a range of from 0.001 to 1.0, as molar ratio, relative to an aluminum atom, is provided.

In addition, according to a fifteenth aspect of the present invention, the process for production of the propylene block copolymer according to any one of the ninth to the fourteenth aspects, characterized in that the latter step is carried out in a gas phase polymerization reactor process that is mechanically stirred, is provided.

In addition, according to a sixteenth aspect of the present invention, the process for production of the propylene block copolymer according to any one of the ninth to the fifteenth aspects, characterized in that the carrier is an inorganic compound based carrier with a nearly spherical shape, and the average particle diameter thereof is from 25 to 200 μm, is provided.

In addition, according to a seventeenth aspect of the present invention, the process for production of the propylene block copolymer according to the sixteenth aspect, characterized in that average crush strength of the inorganic compound based carrier is from 1 to 20 MPa, is provided.

The propylene block copolymer of the present invention is improved in amount of a copolymer of propylene and ethylene or an α-olefin, or a comonomer composition of the copolymer, and has higher amount of the propylene-α-olefin copolymer, and higher comonomer composition of the copolymer, and smaller content of a low molecular weight component as compared with conventional technology, and thus is a propylene block copolymer with good polymer powder form, excellent flexibility or impact resistance, good antiblocking property without sticky feeling, less gel generation in molding, low coefficient of linear expansion. In addition, according to a process for production of the propylene block copolymer of the present invention, the above propylene block copolymer can be stably and efficiently produced.

DETAILED DESCRIPTION OF THE INVENTION

The propylene block copolymer of the present invention is a novel polymer obtainable by a multi-step polymerization reaction, in the presence of a metallocene catalyst supported on a carrier comprising:

the former step for producing a propylene homopolymer component, or a propylene copolymer component (PP) composed of propylene and at least one kind of a comonomer selected from the group consisting of ethylene and/or a $C_{4-20}$ α-olefin, wherein content of the comonomer being equal to or less than 10% by weight; and the latter step for producing a copolymer component (CP) composed of propylene and at least one kind of a comonomer selected from the group consisting of ethylene and/or a $C_{4-20}$ α-olefin, characterized by satisfying the above requisites (1) to (4).

In addition, a process for production of the present invention is a process for production of the above propylene block copolymer, wherein the former step produces a propylene homopolymer component, or a propylene copolymer component (PP) composed of propylene and at least one kind of a comonomer selected from the group consisting of ethylene and/or a $C_{4-20}$ α-olefin, wherein content of the comonomer being equal to or less than 10% by weight, in the presence of a metallocene catalyst supported on a carrier, in order to provide the obtained polymer a desired property, so that average particle diameter of the PP is equal to or larger than the specified value; and the latter step produces, by gas phase polymerization, a copolymer component (CP) composed of propylene and at least one kind of a comonomer selected from the group consisting of ethylene and/or a $C_{4-20}$ α-olefin.

Explanation will be given in detail below on features of the propylene block copolymer of the present invention, a production process thereof, a catalyst used in a production process thereof, polymerization steps or the like, by each item.

I. Features of the Propylene Block Copolymer

The propylene block copolymer of the present invention features that it satisfies the following requisites (1) to (4); and is, further preferably, one satisfying the following requisite (5).

1. Requisite (1): Content of CP in the Propylene Block Copolymer

The propylene block copolymer of the present invention is required to have content of a propylene-α-olefin copolymer component (CP) composed of propylene and ethylene and/or a $C_{4-20}$ α-olefin, occupying therein, is from 45 to 99% by weight, preferably from 45 to 80% by weight, further preferably from 50 to 80% by weight, and particularly preferably from 50 to 70% by weight. In general, in a propylene block copolymer, a propylene-α-olefin copolymer is a random copolymer, and a main component thereof is a substance showing rubber-like property having poor crystallizability, and is a fundamental factor expressing impact resistance or flexibility. In the propylene-α-olefin copolymer in the block copolymer of the present invention, excellent property is shown in a wide range of a CP content of from 45 to 99% by weight, because of having high random copolymerizability, and CP content below 45% by weight can exert only insufficient flexibility. It is preferable that flexural modulus value, which is an index of flexibility, is equal to or lower than 800 MPa. On the other hand, CP content over 99% by weight cannot provide well balanced property as the propylene block copolymer, and raises a problem of such as reduced stiffness, due to having low PP content, however, by setting to be within the above-described range, a block copolymer having excellent property can be obtained.

CP content can be set within this range by making mass of PP produced in the former step in a process for production to be described later, and mass of CP produced in the latter step, to be a predetermined ratio.

Description will be given later on definition of CP content and a measurement method therefor.

2. Requisite (2): Polymerization Ratio of a Comonomer in CP

The propylene block copolymer of the present invention is required to have a polymerization ratio of a comonomer in CP of from 30 to below 100% by mole, preferably from 40 to below 100% by mole, more preferably from 40 to 99% by mole, further preferably from 45 to 99% by mole, further more preferably from 45 to 95% by mole, particularly preferably from 45 to 80% by mole, and further particularly preferably from 50 to 80% by mole. The polymerization ratio of the comonomer of below 30% by mole incurs disadvantage of reduced impact strength or flexibility at low temperature.

The polymerization ratio of the comonomer in CP is a factor influencing crystallizability and rubbery characteristics of the propylene-α-olefin copolymer, in particular, giving large effect on impact resistance property at a low temperature especially of equal to or lower than room temperature, in particular, at ultra low temperature such as from −10 to −30° C. The polymerization ratio of the α-olefin in CP can be controlled to desired value in a range specified in the present invention, by adjustment of composition ratio of raw material gas, in a production step of the propylene-α-olefin block copolymer in the latter step.

Description will be given later on a measurement method for the comonomer in CP.

3. Requisite (3): Weight Average Molecular Weight of CP

The propylene block copolymer of the present invention is required to have a weight average molecular weight of CP of equal to or higher than 100,000 and equal to or lower than 2,000,000, preferably equal to or higher than 150,000 and equal to or lower than 1,500,000, and further preferably equal to or higher than 200,000 and equal to or lower than 1,200,000. The weight average molecular weight of CP is a factor giving large effect on impact resistance: and weight average molecular weight of CP below 100,000 provides insufficient impact resistance and thus incurs disadvantage; while the weight average molecular weight of CP over 2,000,000 deteriorates moldability and provides poor product appearance.

The weight average molecular weight of CP can be controlled by the addition amount of a molecular weight modifier in polymerization in the latter step in a production process to be described later. As the molecular weight modifier, hydrogen is most preferable.

Explanation will be given below on a measurement method for the weight average molecular weight of CP.

In the present invention, the content of CP in the propylene block copolymer, the polymerization ratio of an α-olefin in CP, and the weight average molecular weight of CP are determined by the following methods. It should be noted that the following examples are for the case where ethylene is used as an α-olefin in CP, however, they can be determined in accordance with the following methods, even in the cases where an α-olefin is other than ethylene.

(1) An Analysis Instrument to be Used (i) A Cross-Fractionation Apparatus

CFC T-100 manufactured by DIA Instruments Co., Ltd. (hereinafter abbreviated as "CFC")

(ii) Fourier Transform Infrared Absorption Spectroscopy

FT-IR, 1760X, manufactured by Perkin Elmer, Inc.

A fixed wavelength type infrared spectrometer installed as a detector of CFC is taken off, and instead of it, FT-IR is connected and this FT-IR is used as the detector. A transfer line from an outlet of a solution eluted from CFC to FT-IR is set up so as to have a length of 1 m, and kept at a temperature of 140° C. throughout the measurement. As a flow cell installed in FT-IR, one having an optical path length of 1 mm and an optical path width of 5 mmφ is used, and kept at a temperature of 140° C. throughout the measurement.

(iii) Gel Permeation Chromatography (GPC)

Three GPC columns (AD806MS, manufactured by Showa Denko KK) were connected in series for use at the latter stage of CFC.

(2) Measurement Conditions of CFC (i) Solvent: Orthodichlorobenzene (ODCB)

(ii) Sample concentration: 4 mg/mL (iii) Injection amount: 0.4 mL (iv) Crystallization: Temperature is decreased from 140° C. to 40° C. over about 40 minutes.

(v) A fractionation method:

Fractionation temperature at the time of temperature-rising elution fractionation is fixed at 40, 100 and 140° C., and the sample is fractionated into three fractions in total. It should be noted that the eluted ratio (unit: % by weight) of a component eluted at not higher than 40° C. (fraction 1), a component eluted at from 40 to 100° C. (fraction 2), and a component eluted at from 100 to 140° C. (fraction 3) is defined as $W_{40}$, $W_{100}$ and $W_{140}$, respectively. $(W_{40}+W_{100}+W_{140})$ is equal to 100. Also, each of the fractionated fractions is automatically transported to the FT-IR analysis instrument as it is.

(vi) Solvent flow rate at the time of elution: 1 mL/min (3) Measurement Conditions of FT-IR After the elution of the sample solution is started from GPC of the subsequent stage of CFC, the FT-IR measurement is carried out under the following conditions, and GPC-IR data with respect to each of the above fractions 1 to 3 are collected.

(i) Detector: MCT (ii) Resolution: 8 $cm^{-1}$ (iii) Measurement interval: 0.2 minute (12 seconds)

(iv) Number of scans per measurement: 15 times (4) Post-Treatment and Analysis of Measurement Results Elution amount and molecular weight distribution of the component eluted at each temperature are determined using an absorbance at 2945 $cm^{-1}$ obtained by FT-IR, as a chromatogram. The elution amount is standardized so that the sum of the elution amounts of each of the eluting components is 100%. Conversion from the retention volume to molecular weight is carried out using a calibration curve prepared in advance with standard polystyrenes.

The standard polystyrenes to be used are the following brand-name merchandises, manufactured by Tosoh Corporation: F380, F288, F128, F80, F40, F20, F10, F4, F1, A5000, A2500, and A1000.

0.4 mL of a solution prepared by dissolving 0.5 mg/mL of each of the standard polystyrenes (containing 0.5 mg/mL of BHT) is injected to prepare the calibration curve. The calibration curve employs a cubic expression obtained by approximation using the least squares method. The conversion to molecular weight employs a universal calibration curve by referring to Sadao Mori, "Size Exclusion Chromatography" (Kyoritsu Shuppan). For the viscosity equation used here ($[\eta]=K \times M\alpha$), the following numerical values are used.

(i) At the time of preparation of the calibration curve using standard polystyrenes:

$K=0.000138$, $\alpha=0.70$ (ii) At the time of measurement of a sample of the propylene block copolymer:

$K=0.000103$, $\alpha=0.78$

Ethylene content distribution of each of the eluting components (distribution of the ethylene content along the molecular weight axis) is determined by conversion to ethylene polymerization ratio (% by mole), using ratio of absorbance at 2956 $cm^{-1}$ to absorbance at 2927 $cm^{-1}$ obtained by GP-IR from a calibration curve prepared in advance using polyethylene, or polypropylene, or ethylene-propylene-rubber (EPR) whose ethylene content is known by $^{13}C$-NMR measurement or the like, and mixtures thereof.

(5) CP Content

CP content of the propylene block copolymer in the present invention is defined according to the following equation (I), and determined by the following procedure.

$$CP\ content\ (\%\ by\ weight) = W_{40} \times A_{40}/B_{40} + W_{100} \times A_{100}/B_{100} \quad (I)$$

In the equation (I), $W_{40}$ and $W_{100}$ each represents elution ratio (unit: % by weight) at each of the above fractions; $A_{40}$ and $A_{100}$ each represents average ethylene content (unit: % by weight) measured at each of the fractions corresponding to $W_{40}$ and $W_{100}$, respectively; and $B_{40}$ and $B_{100}$ each represents ethylene content (unit: % by weight) of CP contained in each of the fractions. How to determine $A_{40}$, $A_{100}$, $B_{40}$ and $B_{100}$ will be described later.

The meanings of the equation (I) are as follows.

Namely, the first term in the right of the equation (I) is a term for calculating amount of CP contained in the fraction 1 (portion soluble at 40° C.). In the case where the fraction 1 contains only CP but does not contain PP, $W_{40}$ contributes to CP content derived from the fraction 1 occupying in the whole as it is. However, because the fraction 1 also contains a small amount of PP-derived components (components having extremely low molecular weight, and atactic polypropylene) in addition to CP-derived components, it is necessary to correct that portion. Thus, by multiplying $W_{40}$ by $A_{40}/B_{40}$, the amount derived from CP components in the fraction 1 is calculated. For example, in the case where the average ethylene content ($A_{40}$) of the fraction 1 is 30% by weight, and the ethylene content ($B_{40}$) of CP contained in the fraction 1 is 40% by weight, 30/40=3/4 (namely, 75% by weight) of the fraction 1 is derived from CP, and 1/4 1 is derived from PP. In this way, the operation of multiplication by $A_{40}/B_{40}$ in the first term in the right means calculation of the contribution of CP from % by weight ($W_{40}$) of the fraction 1.

The second term in the right is also the same, and with respect to each of the fractions, one obtained by calculating the contribution of CP and by the addition thereof is defined as CP content.

Average ethylene contents, $A_{40}$, $A_{100}$ and $A_{140}$ of the fractions 1 to 3 can be obtained by summation of each of the products between weight ratio by each data point in chromatogram of absorbance at 2945 $cm^{-1}$, and ethylene content (obtained by ratio of absorbance at 2956 $cm^{-1}$, to absorbance at 2927 $cm^{-1}$) by each data point.

The ethylene content corresponding to the peak position in a derivative molecular weight distribution curve of the fraction 1 is defined as $B_{40}$ (unit: % by weight). As for the fraction 2, it is considered that the rubber portion is all eluted at 40° C., and the ethylene content cannot be defined in the same manner. Accordingly, in the present invention, the ethylene content is defined as $B_{100}$=100. $B_{40}$ and $B_{100}$ each represents the ethylene content of CP contained in each of the fractions, but it is substantially impossible to analytically determine this value. This is because there is no means for completely fractionating and recovering PP and CP co-present in the fraction. As a result of investigations using a variety of model samples, it has been found that as to $B_{40}$, when the ethylene content corresponding to the peak position of the derivative molecular weight distribution curve of the fraction 1 is used, it is possible to well explain improving effect on material properties. Also, from two reasons that $B_{100}$ has crystallizability derived from the ethylene sequence, and that the amount of CP contained in these fractions is relatively small as compared with the amount of CP contained in the fraction 1, the case where $B_{100}$ is approximated to 100 is close to an actual state and does not substantially cause error in the calculation. Thus, the analysis is carried out on the assumption of $B_{100}$=100. Therefore, CP content is determined according to the following equation.

$$CP \text{ content (\% by weight)} = W_{40} \times A_{40}/B_{40} + W_{100} \times A_{100}/100 \quad (II)$$

Namely, ($W_{40} \times A_{40}/B_{40}$) as the first term in the right of the equation (II) represents CP content (% by weight) not having crystallizability; and ($W_{100} \times A_{100}/100$) as the second term represents CP content (% by weight) having crystallizability.

The ethylene content in the copolymer component is determined by the following equation (III), using the content of the copolymer component determined by the equation (II).

$$\text{Ethylene content in the copolymer component (\% by weight)} = (W_{40} \times A_{40} + W_{100} \times A_{100} + W_{140} \times A_{140})/[\text{content of the copolymer component (\% by weight)}] \quad (III)$$

It should be noted that, the meaning of setting up the above three kinds of the fractionation temperature is as follows. In the CFC analysis of the present invention, it is meant that "40° C." is a temperature condition necessary and sufficient for fractionating only polymers not having crystallizability (for example, the majority of CP, or a component having extremely low molecular weight and an atactic component in the propylene polymer component (PP)). It is meant that "100° C." is a temperature condition necessary and sufficient for eluting only the component that is insoluble at 40° C. but becomes soluble at 100° C. (for example, a component having crystallizability derived from ethylene and/or propylene sequence in CP, and PP having low crystallizability). It is meant that "140° C." is a temperature necessary and sufficient for eluting only the component that is insoluble at 100° C. but becomes soluble at 140° C. (for example, a component having particularly high crystallizability in PP, and a component having especially high molecular weight, and especially high ethylene crystallizability in CP), and for recovering the whole amount of the propylene block copolymer to be used for the analysis. It should be noted that, because the CP component is not at all contained in $W_{140}$, or even when it is present, amount thereof is extremely small and substantially negligible, $W_{140}$ is excluded from the calculation of the CP content or the ethylene content.

(6) Ethylene Polymerization Ratio

The ethylene content in CP is determined according to the following equation.

$$\text{Ethylene content in } CP \text{ (\% by weight)} = (W_{40} \times A_{40} + W_{100} \times A_{100})/[CP]$$

In this equation, [CP] is the CP content (% by weight) determined as above.

From the value of the ethylene content (% by weight) in CP obtained here, it is finally converted to % by mole, using molecular weight of ethylene and propylene.

(7) Weight Average Molecular Weight of CP

Weight average molecular weight of CP is defined as weight average molecular weight of a soluble portion at 40° C., by CFC analysis.

4. Requisite (4): Ratio of a Component with a Molecular Weight of Equal to or Less than 5000 (M≦5000) by Measurement with Gel Permeation Chromatography (GPC)

The propylene block copolymer of the present invention features that it has small amount of a low molecular weight component. The low molecular weight component, in particular, a component with molecular weight thereof not as large as molecular weight between entanglement points not only bleeds out at the surface of a molded part and causes stickiness, but also raises a problem in handling of the polymer powder, and thus it is desirable to suppress generation thereof.

Molecular weight between entanglement points of polypropylene is about 5000, as is described in Journal of Polymer Science Part B: Polymer Physics; 37, 1023 to 1033 (1999).

Therefore, the propylene block copolymer of the present invention features that it has small amount of a low molecular weight component and a component having a weight average molecular weight of equal to or less than 5000, by GPC measurement, is equal to or less than 2.0% by weight, preferably equal to or less than 1.5% by weight.

To obtain such a propylene block copolymer, it is necessary that polymerization conditions, in particular a monomer composition, is maintained to be different specified value corresponding to each of the polymer compositions of the former step and the latter step in a production process to be described later. In particular, generation of the low molecular weight component can be suppressed, independent from polymerization conditions, by shortening switching time between the former step and the latter step, or by completely purging a monomer gas mixture corresponding to the former step in the switching, with inert gas like nitrogen or the like.

A measurement method for gel permeation chromatography is as follows.

(i) Apparatus: GPC (ALC/GPC 150C) manufactured by WATERS Co., Ltd.

(ii) Detector: MIRAN 1A IR detector manufactured by FOXBORO Co., Ltd. (wave length for the measurement: 3.42 μm)

(iii) Column: AD806M/S (three pieces) manufactured by Showa Denko KK.

(iv) Solvent for a mobile phase: Orthodichlorobenzene (ODCB)

(v) Measurement temperature: 140° C.

(vi) Flow rate: 1.0 mL/min (vii) Charge amount: 0.2 mL (viii) Preparation of a sample:

As the sample, a 1 mg/mL solution was prepared using ODCB (containing 0.5 mg/mL of BHT) and dissolving at 140° C. over about 1 hour.

As for conversion from retention volume to molecular weight, the same method as carried out in CFC was adopted.

From a plot of elution ratio relative to molecular weigh obtained by the above GPC measurement, amount of the component having a molecular weight of equal to or less than 5000 can be determined.

5. Requisite (5): Bulk Density (BD) of the Propylene Block Copolymer

The propylene block copolymer of the present invention preferably has a bulk density of equal to or higher than 0.37 g/cm³. The upper limit is about 0.55 g/cm³ and preferably in a range of from 0.40 to 0.50 g/cm³. The bulk density lower than 0.37 g/cm³ generates adherence onto or clogging of a line, the inner wall of a polymerization reactor, a piping, a heat exchanger or the like, and could raise a problem that polymerization cannot be stably carried out.

Setting of the bulk density within this range can be attained by adjustment of catalyst production such as adjustment of particle diameter or particle shape of a carrier, as described later, or by selecting polymerization conditions so that no aggregation or fracture generates.

II. Production of the Propylene Block Copolymer

1. Catalyst

Production of the propylene block copolymer of the present invention requires use of a metallocene catalyst supported onto a carrier. A catalyst system required in producing the propylene block copolymer is not especially limited as long as being metallocene catalysts supported onto a carrier, however, among them, a suitable metallocene catalyst includes one composed of (A) a metallocene complex composed of a transition metal compound of the fourth group of the periodic table, or the like, having a conjugated five-member-ring ligand, (B) a co-catalyst for activating thereof, along with (C) an organoaluminum compound used if necessary, and (D) a carrier. Explanation will be given on (A) to (D). It should be noted that in the description of the present specification, a short cycle type is used as the periodic table for elements.

(1) Metallocene Complex (A)

As a representative metallocene catalyst used in the present invention, metallocene complexes of transition metal compounds of the fourth to sixth group of the periodic table, having a conjugated five-member-ring ligand are included; among these, any one represented by the following general formulae is preferable:

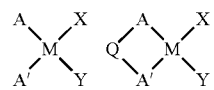

In the above general formulae, A and A' represent a cyclopentadienyl group which may have a substituent. As an example of this substituent, a $C_{1-30}$ hydrocarbon group (which may contain a hetero atom such as halogen, silicon, oxygen, sulfur or the like) is included. This hydrocarbon group may be bonded with a cyclopentadienyl group as a monovalent group, or in the case where a plurality of the hydrocarbon groups are present, two of them may form a ring together with a part of the cyclopentadienyl group by each bonding at the different end (ω-end). As other examples, an indenyl group, a fluorenyl group, or an azulenyl group and the like are included. These groups may further have a substituent at the sub-ring thereof. Among these, an indenyl group or an azulenyl group is preferable.

Q represents a bonding group, which provides a cross-link between two conjugated five-member-ring ligands at an arbitrary position; specifically it is preferable to be an alkylene group, a silylene group, a silafluorene group, or a germylene group.

M represents a metal atom of a transition metal selected from the fourth to sixth group of the periodic table, preferably titanium, zirconium, hafnium or the like. In particular, zirconium or hafnium is preferable.

X and Y represent auxiliary ligands, and generate an activated metallocene having olefin polymerization capability by reaction with the component (B). Therefore, the kind of X and Y ligands is not limited as long as this object can be attained, and each of them is exemplified by a hydrogen atom, a halogen atom, a hydrocarbon group, or a hydrocarbon group which may have a hetero atom. Among these, preferable one is a $C_{1-10}$ hydrocarbon group or a halogen atom.

(2) The Co-Catalyst (Activation Agent Component) (B)

The co-catalyst is a component for activating a metallocene complex, and is a compound that is capable of converting the complex to activated species having olefin polymerization capability, by reaction with the auxiliary ligand of the metallocene complex; specifically, (B-1): an aluminum oxy compound; (B-2): an ionic compound or a Lewis acid which is capable of converting the component (A) to a cation by reacting with the component (A); (B-3): a solid acid; and (B-4): an ion exchange layered silicate are included. Explanation will be given below on (B-1) to (B-4).

(B-1) An Aluminum Oxy Compound

As for (B-1) an aluminum oxy compound, it is widely known that an aluminum oxy compound is capable of activating a metallocene complex; as such a compound, specifically a compound represented by each of the following general formulae is included:

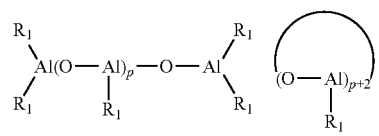

-continued

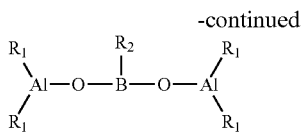

In each of the above general formulae, $R_1$ represents a hydrogen atom or a hydrocarbon residual group, preferably a $C_{1-10}$ hydrocarbon residual group, particularly preferably a $C_{1-6}$ hydrocarbon residual group. In addition, a plurality of $R_1$s may be the same or different each other. In addition, p represents an integer of from 0 to 40, preferably from 2 to 30.

Compounds represented by the first and the second formula, among the above general formulae, are compounds also called aluminoxane, and among these, methylaluminoxane, or methylisobutylaluminoxane is preferable. The above aluminoxane may be used in combination of a plurality of kinds in each of the groups, or between each of the groups. The above aluminoxane can be prepared under various known conditions.

A compound represented by the third general formula can be obtained by a reaction between one kind of a trialkylaluminium, two or more kinds of the trialkylaluminium, and an alkyl boronic acid represented by the general formula of $R_2B(OH)_2$, in 10:1 to 1:1 (mole ratio). In the general formulae, $R_1$ and $R_2$ represent a $C_{1-10}$ hydrocarbon residual group, preferably a $C_{1-6}$ hydrocarbon residual group.

(B-2) An Ionic Compound or a Lewis Acid that is Capable of Reacting with the Component (A) and Converting the Component (A) to a Cation A compound (B-2) is an ionic compound or a Lewis acid that is capable of reacting with the component (A) and converting the component (A) to a cation; as such an ionic compound, a complex between a cation such as a carbonium cation, an ammonium cation, and an organic boron compound such as triphenylboron, tris(3,5-difluorophenyl)boron, tris(pentafluorophenyl)boron or the like is included.

In addition, as the above Lewis acid, various organic boron compounds, for example, tris(pentafluorophenyl)boron and the like are illustrated, or metallic halogen compounds such as aluminum chloride, magnesium chloride and the like are illustrated.

It should be noted that a certain kind of the above Lewis acid may also be understood as an ionic compound that is capable of reacting with the component (A) and converting the component (A) to a cation. A metallocene catalyst using the above-described non-ligand-like boron compound is exemplified in JP-A-3-234709, JP-A-5-247128 or the like.

(B-3) Solid Acid

As a solid acid, (B-3), alumina, silica-alumina, silica-magnesia, or the like is included.

(B-4) An Ion Exchange Layered Compound

An ion exchange layered compound of (B-4), is one constituting a large percentage of clay minerals, and is preferably an ion exchange layered silicate.

The ion exchange layered silicate (hereafter may be abbreviated simply as "silicate") means a silicate having a crystal structure where planes constituted by an ionic bond or the like are superimposed in parallel each other by means of a bonding power and ions to be contained are exchangeable. Since a majority of silicates are naturally produced mainly as the major component of clay minerals, in many cases, they contain impurities (for example, quartz and cristobalite or the like) other than the ion exchange layered silicate, and those impurities may be contained. As the silicate, various known ones can be used. Specific examples of the silicate include the following layered silicate described in Haruo Shiromizu, "Clay Mineralogy", Asakura Shoten (1995).

(i) 2:1 Type Minerals

A smectite group such as montmorillonite, sauconite, beidellite, nontronite, saponite, hectorite, stevensite or the like; a vermiculite group such as vermiculite or the like; a mica group such as mica, illite, sericite, glauconite or the like; a pyrophillite-talc group such as pyrophillite, talc or the like; a chlorite group such as magnesian chlorite or the like.

(ii) 2:1 Ribbon Type Minerals

Sepiolite, palygorskite or the like.

The silicate that is used as a raw material in the present invention may be a layered silicate. In the present invention, it is preferable that a silicate in which the silicate, as the major component, has a 2:1 type structure; further preferably it is a smectite group, and particularly preferably montmorilonite. The silicate used in the present invention, namely, a natural product or available one as an industrial raw material, may be used as it is without subjecting to any special treatment, however, it is preferable that it is subjected to chemical treatment. Specifically, acid treatment, alkali treatment, salt treatment, organic treatment or the like is included. These treatments may be combined each other. In the present invention, conditions of these treatments are not especially limited, and known conditions can be used.

It should be noted that, because these ion exchange layered silicates usually contain adsorbed water or inter-layer water, it is preferable that they are used after removing moisture by subjecting to heating dewatering treatment under inert gas flow.

(3) An Organoaluminum Compound (C)

In the present invention, as the organoaluminum compound used if necessary in a metallocene catalyst system, one not containing a halogen is used, specifically a compound represented by the following general formula is used:

$AlR_{3-i}X_i$ 

(wherein R represents a $C_{1-20}$ hydrocarbon group; X represents hydrogen and an alkoxy group; and i represents a number satisfying $0<i\leq3$, provided that when X is hydrogen, $0<i<3$.)

As a specific compound, a trialkylaluminium such as trimethylaluminium, triethylaluminium, tripropylaluminium, triisobutylaluminium, trioctylaluminium, or the like; or an alkoxy-containing alkylaluminium such as diethylaluminium methoxide, diethylaluminium methoxide, diisobutylaluminium methoxide, diisobutylaluminium ethoxide, or the like; or an halide-containing alkylaluminium such as diethylaluminium halide, or the like is included. Among these, a trialkylaluminium is particularly preferable, and triisobutylaluminium and trioctylaluminium are further preferable.

(4) A Carrier (D)

The propylene block copolymer of the present invention features that it has high content of a copolymer component, which is a rubber component; and in order to stably produce such a polymer having high content of the rubber component, it is necessary to use a supported type catalyst with a catalyst carrier. As the catalyst carrier, a known one can be used, however, as a preferable carrier, an inorganic carrier such as silica, titania, alumina, silica-alumina, silica-magnesia, ion exchange layered silicate, or the like; or a polymeric carrier such as polypropylene powder, polyethylene powder, or the like is included.

Among these, as for a catalyst used, use of a supported catalyst controlled with the shape and particle diameter is particularly preferable, to adjust a polymer particle shape and make large particle diameter. Since the shape or particle diameter of a catalyst is nearly the same as the shape or particle diameter of the carrier, the shape or particle diameter of a catalyst can be controlled by controlling the shape and particle diameter of the carrier. For example, in the case of using an inorganic compound carrier, the following example can be included.

It is preferable that particle diameter of the inorganic compound carrier of a raw material has an average particle diameter of from 0.01 to 5 μm and ratio of particles below 1 μm is equal to or more than 10%; preferably an average particle diameter of from 0.1 to 3 μm and ratio of particles with below 1 μm is equal to or more than 40%. As a method for obtaining the inorganic compound carrier with such particle diameter, there is a dry type method for making micro-particles, such as a jet mill, a ball mill, a vibration mill or the like; or a method for crushing under a wet state; a method for crushing by enforced stirring using "POLYTRON" or the like; or a method by "DYNO-MILL", "PEARL-MILL" or the like.

In addition, the carrier may be used after granulating to preferable particle diameter, and a method for granulation thereof includes, for example, a stirring granulation; a spray granulation; a rolling granulation; a briquetting; a fluidized-bed granulation; or a granulation in liquid is included. A preferable method for granulation is a stirring granulation; a spray granulation; a rolling granulation; or a fluidized-bed granulation; and further preferably, a spray granulation. It is preferable that particle strength of the carrier is within a certain range. Too low particle strength of the carrier generates fine powder, deteriorates fluidity or adhesion, and reduces bulk density, because catalyst powders or polymer particles are labile to fracture. Therefore, in the present invention, average crushing strength of the carrier is desirably equal to or higher than 1 MPa, more preferably equal to or higher than 3 MPa. On the other hand, too high particle strength may inhibit uniform activation of a catalyst in pre-polymerization or polymerization, or may provide inhomogeneous particle growth, resulting in fine powder, in some cases. Therefore, the upper limit of carrier strength is desirably, as average crushing strength, equal to or lower than 20 MPa, more preferably equal to or lower than 15 MPa. Use of the inorganic compound carrier with the above-described particle diameter distribution is preferable, to obtain crushing strength within a preferable range.

Furthermore, granulation methods in the case where granulation is carried out in multi-stages may be combined, and the combination is not limited, however, preferably a combination of a spray granulation and a spray granulation; a spray granulation and a rolling granulation; or a spray granulation and a fluidized-bed granulation.

The shape of the resultant granulated particles obtained by a granulation method as above is preferably a spherical shape; specifically such a shape is preferable as satisfying that number of particles having an M/L value of equal to or larger than 0.8 and equal to or smaller than 1.0 is equal to or more than 50% and equal to or less than 100% of total particles (here, L and M represent value of maximal diameter of a particle of a projection view and value of diameter orthogonal to L, respectively); and it is more preferable that number of particles having an M/L value of equal to or larger than 0.8 and equal to or smaller than 1.0 is equal to or more than 85% and equal to or less than 100% of total particles.

It should be noted that M/L is value obtained by observing arbitrary particles equal to or more than 100 with an optical microscope, and determining by image processing thereof.

Concentration of the silicate in raw material slurry liquid, in a spray granulation wherein spherical inorganic compound carrier particles are obtained, is from 0.1 to 50% by weight, preferably from 0.5 to 30% by weight, and particularly preferably from 5.0 to 20% by weight, although it depends on slurry viscosity. Temperature at the entrance of hot air in a spray granulation wherein spherical particles are obtained, is from 80 to 260° C. and preferably from 100 to 220° C., taking water as an example, although different by a dispersing medium. Any arbitrary dispersing medium, suited to accomplish an end, may be used; water or an organic solvent, for example, methanol, ethanol, chloroform, methylene chloride, pentane, hexane, heptane, toluene, xylene, singly, or as a mixture solvent thereof may be used; among these, particularly preferable one is water.

The inorganic compound carrier obtained in this way may be used as it is as a catalyst carrier. In this case, preferable particle diameter is from 25 to 200 μm, and further preferably from 25 to 150 μm.

In addition, particle diameter of a raw material may be prepared in at least two steps, to obtain particles with a regular shape and desired particle diameter; namely, in the first granulation step, by granulation to particle diameter enabling granulation to some extent, and by subjecting to re-granulation processing using thereof, a particle shape and particle diameter can be controlled. In the first granulation step, inorganic compound carrier fine particles of a raw material with an average particle diameter of from 0.01 to 5 μm are granulated to produce the primary granulated particles. Particle diameter of the primary granulated particles is preferably from 1 to 25 μm, and further preferably from 1 to 15 μm.

The primary particles granulated in this way are further converted to slurry and subjected to the next granulation. In this case, because slurry viscosity becomes relatively low, slurry concentration can be increased. By adoption of suitable spray granulation conditions, particle diameter and a particle shape suitable to a polymerization catalyst component can be obtained. Particle diameter, which can be produced, is from 25 to 200 μm, and preferably from 25 to 150 μm, although it depends on the kind of the inorganic compound carrier of a raw material.

Granulation conditions can be selected as appropriate so that particles with good property can be obtained by the granulation method. For example, in a spray granulation method, entrance temperature of hot air in spraying can be set in a wide temperature range of from about 90 to 300° C. In addition, exit temperature is specified by spraying flow amount, or hot air flow amount from a nozzle or a disk, and becomes from 80 to 150° C. As a spraying type, a general spray drying method such as a disk type or a pressure nozzle type, a two fluid nozzle type or the like can be applied. Particle diameter can be controlled by setting flow amount of spraying liquid, rotation number of a disk or disk size, pressure of a pressure nozzle, flow amount of carrier gas or the like.

In the present invention, because the secondary granulated particles are produced by re-granulation of the primary granulated particles, the secondary granulated particles become to have larger size. Increase ratio of diameter of the primary particles relative to raw material particles is preferably from 3 to 500%, and further preferably from 5 to 300%. In addition, increase ratio of diameter of the secondary particles relative to the primary particles is preferably from 3 to 200%, and further preferably from 3 to 100%. Therefore, adoption of different conditions between the primary granulation condition and the secondary granulation condition is capable of providing particles with good powder form. For example, lowering of disk rotation number in the secondary granulation as compared with the primary granulation is capable of providing preferable particles. The disk rotation number in the secondary granulation is preferably lower than the disk rotation number in the secondary granulation by from 1000 to 30000 rpm, and further preferably lower by from 5000 to 20000 rpm. In addition, drying temperature of the secondary granules is preferably lower as compared with the primary granules. Temperature at the entrance of hot air in the secondary granulation is preferably lower than temperature at the entrance of hot air in the primary granulation, by from 10 to 80° C., further preferably by 20 to 50° C.; specifically, although depending on disk size, temperature at the entrance of hot air in the primary granulation is preferably from 130 to 250° C., and further preferably from 150 to 200° C. Disk rotation number is preferably under condition of from 10000 to 30000 rpm. In the secondary granulation, temperature at the entrance of hot air is preferably from 90 to 180° C., and further preferably from 100 to 150° C.; and disk rotation number is preferably under condition of from 5000 to 20000 rpm.

In granulation, an organic substance, an inorganic solvent, an inorganic salt, or various binders may be used. As the binders used, for example, sugar, dextrose, corn syrup, gelatin, glue, carboxymethylcelluloses, polyvinyl alcohol, waterglass, magnesium chloride, aluminum sulfate, aluminum chloride, magnesium sulfate, alcohols, glycol, starch, casein, latex, polyethylene glycol, polyethylene oxide, tar, pitch, alumina-sol, silica gel, gum arabic, sodium alginate, and the like may be included.

In this way, by supporting a metallocene catalyst onto the granulated inorganic compound based carrier, a supported type catalyst having adjusted particle shape and particle diameter can be produced.

2. Use Amount of a Catalyst Component

The component (A) and the component (B) in the above catalyst component are used in the optimal amount ratio in each of the combinations.

In the case where the component (B) is an aluminum oxy compound, molar ratio of Al/transition metal is suitable usually in a range of from equal to or larger than 10 and equal to smaller than 100000, further from equal to or larger than 100 and equal to smaller than 20000, and particularly from equal to or larger than 100 and equal to smaller than 10000. On the other hand, in the case where an ionic compound or a Lewis acid is used as the component (B), molar ratio relative to a transition metal is in a range of from 0.1 to 1000, preferably from 0.5 to 100, and further preferably from 1 to 50.

In the case where the solid acid or the ion exchange layered silicate is used as the component (B), a transition metal complex is in a range of from 0.001 to 10 mmol, preferably from 0.001 to 1 mmol per 1 g of the component (B).

These use ratios show usual ratio examples, and it is natural that the present invention is not limited by the above use ratio range, as long as a catalyst is one suited to accomplish an end.

A catalyst used in the present invention may be subjected to a pre-polymerization processing; wherein an olefin such as ethylene, propylene, 1-butene, 1-hexene, 1-octene, 4-methyl-1-pentene, 3-methyl-1-butene, vinylcycloalkane, styrene, or the like is preliminarily polymerized in a small quantity, after supported onto the carrier, before using a polyolefin producing catalyst, composed of the transition metal complex and the co-catalyst, as the catalyst for olefin polymerization (final polymerization), if necessary.

3. A Polymerization Reaction

A process for production of the propylene block copolymer of the present invention is constituted by a former step for producing a propylene homopolymer component, or a propylene copolymer component (hereafter referred to as PP) composed of propylene and at least one kind of a comonomer selected from the group consisting of ethylene and/or a $C_{4-20}$ α-olefin, wherein content of the comonomer being equal to or less than 10% by weight; and a latter step for producing a copolymer component (hereafter referred to as CP) composed of propylene and at least one kind of a comonomer selected from the group consisting of ethylene and/or a $C_{4-20}$ α-olefin.

In addition, in the former step, a polymerization method of any of a bulk polymerization method or a gas phase polymerization method may be adopted, however, because a gas phase polymerization method is preferable in the latter step subsequent thereto, adoption of a gas phase polymerization method also in the former step is preferable.

Namely, in the case where the PP component was obtained by gas phase polymerization, a drying step can be omitted, because a polymerization solvent is not used. In addition, among the PP components, a polymer having relatively low melting point makes industrially stable production difficult, due to increasing amount of elution components into a solvent, as well as hikes production cost due to requiring also an operation for separation and recovery of the eluted components, and sometimes may not be suitable to industrial, production. Furthermore, carrying out so-called bulk polymerization, wherein the former step is carried out by polymerization in liquid propylene, has risk of dissolution of the polymer during production of a polymer with low melting point, raising a problem of not enabling to increase polymerization temperature up to an industrial level; and further catalytic efficiency in the former step becomes too high due to difficulty in controlling the activity in a bulk polymerization method, and this too high catalytic efficiency in the former step may inhibit attainment of objective CP content in view of activity-reaction time balance.

In this way, in the present invention, by using a catalyst with large particle diameter, as well as adopting a gas phase polymerization method in the former step, and adjusting the activity or reaction time or the like, the novel propylene block copolymer having PP component with high melting point and excellent stiffness, and having high ratio of the CP component generated at the latter step, as aimed by the present invention, can be stably produced.

In the latter step, a vapor polymerization method is adopted, because the propylene-α-olefin copolymer component to be produced is a rubber component and no dissolution thereof in a solvent is desirable. As a process, it is preferable to be carried out in a gas phase polymerization reactor equipped with mechanical stirring.

In addition, as a polymerization type, any of a batch method or a continuous method may be adopted for each of the former step and the latter step. In the present invention, two-step polymerization is carried out composed of the former step and the latter step, however, depending on the case, each of the steps may be further divided. In particular, a method for preparing a plurality of rubber component kinds by dividing the latter step into two or more steps is also a method for improving property.

(1) Production of the Propylene Polymer Component (PP)

In the former polymerization step, by using a metallocene catalyst, preferably a catalyst composed of the above-described components (A), (B), (D), if necessary, (C), a homopolymer of propylene, or a propylene/α-olefin copolymer is produced. Namely, the former step is a step for formation of the homopolymer of propylene or the propylene/α-olefin copolymer in one step or in a multi-step, so as to be equivalent to from 1 to 55% by weight, preferably from 20 to 55% by weight of total polymer amount (total of the propylene block copolymer). As the propylene polymer component (PP), a propylene homopolymer is preferable because stiffness and heat resistance can be enhanced.

In the case where a copolymer of propylene and an α-olefin is used, as the α-olefin, in addition to ethylene, a $C_{4-20}$ α-olefin other than propylene is included. For example, butene-1, hexene-1, 4-methyl-pentene-1, octene-1, decene-1 or the like is included. Among these, ethylene is most preferable. In the case of using the α-olefin, use amount thereof is equal to or less than 10% by weight, preferably equal to or less than 5% by weight, relative to total monomer (total of propylene and the α-olefin).

Polymerization temperature in the former polymerization step is 30 to 120° C., and preferably about 50 to 90° C. Polymerization pressure is from 0.1 to 6 MPa, and preferably from 0.1 to 4 MPa. In addition, it is preferable to use a molecular weight (MFR) modifier so that fluidity of a polymer becomes a suitable level, and as the molecular weight modifier, hydrogen is preferable. A preferable range of MFR is, although it depends on applications of a final polymer, from 0.1 to 3000 g/10 minutes, more preferably from 0.5 to 2000 g/10 minutes, and further preferably from 0.5 to 1000 g/10 minutes. By adopting these conditions, average particle diameter of the polymer (PP) transferred from the former step to the latter step can be set to desired value in the present invention. On the other hand, conditions extremely outside of these ranges reduce industrial productivity.

Melting point of the polymer (PP) is preferably equal to or higher than 157° C. The upper limit is, in view of industrial productivity, usually 165° C., preferably equal to or lower than 163° C., and further preferably equal to or lower than 162° C.

In addition, the propylene block copolymer of the present invention preferably has a melting point of equal to or higher than 157° C. The melting point lower than 157° C. provides insufficient heat resistance and stiffness. To obtain PP having such high melting point, a metallocene catalyst, a co-catalyst, polymerization conditions and the like are used in suitable combination. In general, it can be attained by increasing polymerization pressure and/or lowering polymerization temperature in many cases. In addition, it can be attained also by using the catalyst components (A) to (C), disclosed in the present invention, in combination. In the propylene block copolymer, melting point of the product is controlled by the propylene polymer component (PP). Therefore, melting point of the block copolymer can be said to be approximately melting point, of PP, and a polymerization reaction in the former step becomes dominant. In addition, heat resistance of the propylene block copolymer strongly depends on melting point of PP, and is enhanced more by melting point as high as possible.

(2) Transfer from the Former Step to the Latter Step

A process for production of the propylene block copolymer of the present invention features larger average particle diameter of the polymer (PP) transferred from the former step to the latter step; specifically, the diameter measured by a particle size distribution measurement apparatus, "Camsizer", manufactured by Retsch Technology Co., Ltd., is equal to or larger than 700 μm, preferably equal to or larger than 1 mm, further preferably equal to or larger than 1.2 mm, and more preferably equal to or larger than 1.5 mm.

Since the propylene block copolymer of the present invention features that it has high rubber content, it is necessary to secure powder form in production at a certain level or higher; namely, the rubber component polymerized in the latter step is required to have powder form so that as many amount as possible is incorporated inside the powder, and thus it is required that the polymer (PP) transferred from the former step to the latter step should have enlarged particle diameter and/or be porous. It should be noted that an excessively porous state, on the contrary, weakens strength, generates fine powder by crushing during polymerization, and deteriorates property; therefore, from the industrial viewpoint, adoption of a method for enlarging particle diameter is preferable.

Particle diameter of the polymer transferred from the former step to the latter step can be enlarged by using a catalyst with large particle diameter, or by enhancing catalytic activity in the former step. However, because the propylene block copolymer of the present invention has high ratio of the rubber component polymerized in the latter step, excessively enhanced catalytic activity in the former step could inhibit attainment of objective rubber content in view of activity-reaction time balance; therefore, it is preferable to use a catalyst with large particle diameter.

On the other hand, too large particle diameter causes generation of irregular particles, crushing of particles, or difficulty in drying in the post-processing step, and deteriorates dispersion of additives or the like; therefore, the upper limit of average particle diameter of PP is usually 10 mm, preferably equal to or smaller than 8 mm, and further preferably equal to or smaller than 5 mm.

(3) Production of the Propylene-α-Olefin Copolymer Component (CP)

In the latter polymerization step of the present invention, a vapor polymerization method should be adopted, because the propylene-α-olefin copolymer component to be produced in this step is a rubber component, and no dissolution thereof in a solvent is desirable. As the vapor polymerization method, a known gas phase polymerization process can be used, however, because powder particle diameter is large, it is preferable to be carried out in a gas phase polymerization reactor equipped with mechanical stirring.

In the latter step of the present invention, in polymerization ratio (molar ratio) of propylene and an α-olefin, the propylene-α-olefin copolymer having a polymerization ratio of the comonomer in CP of from 30 to below 100% by mole, preferably from 40 to below 100% by mole, more preferably from 40 to 99% by mole, further preferably from 45 to 99% by mole, further more preferably from 45 to 95% by mole, particularly preferably from 45 to 80% by mole, and further particularly preferably from 50 to 80% by mole is generated.

Here, as the α-olefin, in addition to ethylene, a $C_{4-20}$ α-olefin other than propylene is included. For example, butene-1, hexene-1, 4-methyl-pentene-1, octene-1, decene-1 or the like is included. Among these, ethylene is most preferable, because amount of the CP component can be increased due to high activity and good copolymerizability, as well as ratio of the comonomer in the CP component can be increased.

In addition, in the latter step, amount equivalent to from 45 to 99% by weight, preferably from 45 to 80% by weight, further preferably from 50 to 80% by weight, particularly preferably from 50 to 70% by weight of total polymer amount (total of the propylene block copolymer) is formed.

Polymerization temperature in the latter polymerization step is from 30 to 120° C., and preferably from about 50 to 80°

C. In the latter step, a vapor polymerization method is preferably adopted, because the propylene-α-olefin copolymer component to be produced therein is a rubber component, and non-dissolution thereof in a solvent is desirable. In the case where the gas phase polymerization method is adopted, polymerization pressure is from 0.1 to 5 MPa, preferably from 0.5 to 3 MPa and more preferably from 0.5 to 4 MPa. It is known that too high polymerization pressure results in a super critical state, however, gas phase polymerization in the present invention does not include such a super critical state. In addition, conditions extremely outside of these conditions lower industrial productivity.

In the latter polymerization step, an electron donating compound such as an activated hydrogen-containing compound, a nitrogen-containing compound, an oxygen-containing compound or the like may be present. These compounds aim at improvement of powder form of the propylene block copolymer, reduction of gel or the like. As the activated hydrogen compound, water; alcohols such as methanol, ethanol, or the like; phenols such as phenol, cresol, ethylphenol, or the like; aldehydes such as acetaldehyde, or the like; carboxylic acids such as acetic acid, propionic acid, or the like is included. As the nitrogen containing compound, methylamine, ethylamine, aniline, or the like may be included. As the oxygen containing compound, dimethyl ether, acetone, dimethylmethoxyaluminum, dimethyldimethoxysilane, or the like may be included. These electron donating compounds may be used singly or a mixture thereof may be used. Among these, those having relatively low boiling point and not strong odor are preferable. In particular, alcohols are preferable. In the case where the electron donating compounds are supplied, a range thereof is, in molar ratio, from 0.001 to 1.0, preferably 0.01 to 0.8, relative to an aluminum atom in an organoaluminum compound present in the latter polymerization step.

In addition, it is preferable to use a molecular weight modifier so that fluidity of a polymer becomes a suitable level, and as the molecular weight modifier, hydrogen is preferable.

A range of weight average molecular weight of the propylene-α-olefin polymer in the latter step is from 10,000 to 5,000,000, preferably from 50,000 to 3,000,000, and further preferably from 100,000 to 1,000,000. It is effective that weight average molecular weight of the propylene-α-olefin polymer is as near as weight average molecular weight of a polymer produced in the former step, to suppress gel generation in molding, or reduce coefficient of linear expansion, although it depends on applications of a final polymer. In addition, in consideration of property of a polymer, it is desirable that generation of a rubber component with low molecular weight, which is said to cause stickiness, is as low as possible. Specifically, it is preferable that the component in rubber, having a molecular weight of equal to or less than 5000, is equal to or less than 0.8% by weight relative to total rubber. To attain this, it is necessary to avoid generation of a polymerization reaction under condition different from that in the later step, by adopting polymerization condition so as not to reduce average molecular weight of rubber, or by discharging residual monomers or deactivation of a catalyst quickly after completion of polymerization. It should be noted that amount of the low molecular weight component in rubber is defined as amount of a component with a molecular weight of equal to or less than 5000 in an eluted component at equal to or lower than 40° C., in measurement with the above-described CFC analysis apparatus.

EXAMPLES

Explanation will be given specifically below on the present invention with reference to Examples, however, the present invention should not be limited thereby as long as not departing from the gist thereof. It should be noted that a catalyst synthesis step and a polymerization step below were all carried out under a purified nitrogen atmosphere. In addition, as a solvent, one dehydrated with a molecular sieve MS-4A was used. Explanation will be given below on measurement methods and apparatuses for each of property values, and production examples of catalysts used in the present invention.

1. Measurement Methods for Property Values and Apparatuses Therefor (1) Measurement of Particle Diameter of the Ion Exchange Layered Silicate Particles Particle diameter was measured using a laser diffraction/scattering type particle diameter distribution measurement devise (manufactured by Horiba Ltd.; "LA-920"). Measurement of the ion exchange layered silicate in slurry before granulation was carried out using water as a dispersion medium to calculate particle diameter distribution and average particle diameter (median diameter), based on a refraction index of 1.32 and a shape coefficient of 1.0. Measurement of the ion exchange layered silicate after granulation was carried out similarly, using ethanol as a dispersion medium.

(2) Measurement of MFR

Melt index value of the polypropylene polymer was measured in accordance with JIS-K-6758.

(3) Bulk Density (Polymer BD)

Bulk density of a polymer was measured in accordance with ASTM D1895-69.

(4) Measurement of Crushing Strength

Crushing strength was measured on arbitrarily chosen 100 or more pieces of particles, using a micro compression testing machine, "MCTM-500", manufactured by Shimadzu Corp.; and average value thereof was used as crushing strength.

(5) Measurement of Particle Diameter

Particle diameter was measured using a measurement apparatus of particle size distribution, "Camsizer", (manufactured by Retsch Technology Co., Ltd.).

(6) GPC

GPC was measured in accordance with the above-described method.

(7) CFC-IR

CFC-IR was measured in accordance with the above-described method.

(8) Flexural Modulus (FM)

Flexural modulus was measured in accordance with the following procedures (i) to (iii).

(i) Preparation of Pellets

As compounding components, 0.10% by weight of IRGANOX 1010 (manufactured by Chiba Specialty Chemicals Co., Ltd.), 0.10% by weight of IRGAFOS 5168 (manufactured by Chiba Specialty Chemicals Co., Ltd.), and 0.05% by weight of calcium stearate were compounded into the power-like propylene block copolymer obtained by polymerization, and sufficiently stirred and mixed. The copolymer powder added with the additives was melt kneaded under the following conditions, and a molten resin extruded from a strand die was taken up while cooling in a cooling water tank to obtain raw material pellets by cutting the strand into a diameter of about 2 mm, and a length of about 3 mm, using a strand cutter.

Extruder: KZW-15-45 MG, twin-screw extruder manufactured by Technovel Corp.

Screw: a diameter of 15 mm, L/D=45

Set temperature of extruder: (from under a hopper) 40, 80, 160, 200, 220 and 220 (die) [° C.]

Screw rotation number: 400 rpm

Output amount: adjusted to 1.5 kg/hr by a screw feeder

Die: strand die with a diameter of 3 mm, and a hole number of 2

(ii) Preparation of Test Pieces

Raw material pellets obtained above were injection molded under the following conditions to obtain flat plate test pieces for property evaluation.

Specification number: see JIS-K-7152 (ISO 294-1)

Molding machine: TU-15 injection molding machine, manufactured by Toyo Machinery & Metal Co., Ltd.

Set temperature of the molding machine: (from under a hopper) 80, 160, 200, 200, 200° C.

Mold temperature: 40° C.

Injection speed: 200 mm/s (speed in a mold cavity)

Injection pressure: 800 kgf/cm$^2$

Holding pressure: 800 kgf/cm$^2$

Holding time: 40 seconds

Mold shape: A flat plate (a thickness of 2 mm, a width of 30 mm and a length of 90 mm)

(iii) Measurement of Flexural Characteristics

Using the test pieces obtained above, flexural characteristics was evaluated under the following conditions.

Specification number: In accordance with JIS-K-7171 (ISO 178)

Testing machine: An autograph, AG-20 kNG, a precision universal testing machine, (manufactured by Shimadzu Corp.)

Sampling direction of the test piece: A flow direction

Test piece shape: A thickness of 2.0 mm, a width of 25 mm and a length of 40.0 mm Preparation method for test piece: An injection molded flat plate was punched out into the above dimension (see the "molding item" on molding)

Conditioning: Placed 24 hours or longer in a temperature-controlled room adjusted at a room temperature of 23° C. and a humidity of 50%

Testing room: A temperature-controlled room adjusted at a room temperature of 23° C. and a humidity of 50%.

Number of the test pieces: n=5

Distance between supports: 32.0 mm

Test speed: 1.0 mm/min

Evaluation item: Flexural modulus (9) Impact Resistance

Impact resistance of the resultant block copolymer was evaluated by a Charpy impact test under the following conditions.

Specification number: In accordance with JIS-K-7111 (ISO 179/1eA)

Testing machine: A full-automatic Charpy impact testing machine (provided with a constant temperature-controlled bath), manufactured by Toyo Machinery & Metal Co., Ltd.

Test piece shape: A test piece with a single notch (a thickness of 4 mm, a width of 10 mm and a length of 80 mm)

Notch shape: Type A notch (a notch radius of 0.25 mm)

Impact speed: 2.9 m/s

Nominal pendulum energy: 4 J

Preparation method for the test piece: The notch was cut onto the injection molded test piece (see the "molding item" on molding) (in accordance with ISO 2818)

Conditioning: Placed 24 hours or longer in a temperature-controlled room adjusted at a room temperature of 23° C. and a humidity of 50%

(10) Evaluation of Antiblocking Property

Antiblocking property of the resultant block copolymer was evaluated by the following method.

Two sheets of injection molded flat plates obtained in (9) were overlapped and sandwiched between iron plates, and after leaving for 10 minutes under a load of 1 kg onto the iron plates, the test pieces were taken out from the iron plates to evaluate a sticking state thereof at this time, based on the following standards:

○: The samples did not adhere together and were peeled off just after taking out Δ: The samples adhered together but were easily peeled off by hand x: The samples adhered closely and required a good amount of effort to peel off

(11) Evaluation of Gel

Appearance of the injection molded flat plate obtained in (9) was observed in naked eyes to evaluate gel.

(12) Melting Point

The sample was heated from room temperature up to 230° C. under a condition of 80° C./min, using a DSC7 model differential scanning calorimeter, manufactured by Perkin Elmer Inc. After keeping at that temperature for 10 minutes, the sample was cooled to 50° C. at a rate of −10° C./min, and then kept at that temperature for 3 minutes. Then, peak temperature, at which the sample melted under a heating condition of 10° C./min, was defined as melting point.

2. Production of a Catalyst

Catalyst Production Example 1

(1) Granulation of Fine Particles (the First Stage Granulation Step)

Into a 4.5-L metal container, 2850 mL of distilled water and 150 g of commercially available montmorillonite (Benclay S L, manufactured by Mizusawa Industrial Chemicals, Ltd.) were gradually added and stirred for several hours to form a uniform slurry using "POLYTRON" for 10 minutes. Measurement result of average particle diameter of water slurry of montmorillonite was 0.63 μm. This slurry was subjected to spray granulation using a spray granulation apparatus (LT-8), manufactured by Ohkawara Kakoki Co., Ltd. Slurry properties and operation conditions are as follows.

Slurry properties: pH=9.6, and slurry viscosity=3500 CP; operation conditions: Atomizer rotation number=30000 rpm, liquid supply amount=0.7 L/hr, entrance temperature=200° C., exit temperature=140° C., and cyclone pressure difference=80 mm $H_2O$.

As a result, 90 g of granulated fine particles were recovered. Average particle diameter thereof was 10.1 μm, and the shape was sphere.

(2) Acid Treatment

Into a 1.0-L glass flask equipped with a stirring blade, 510 mL of distilled water and subsequently 150 g of concentrated sulfuric acid (96%) were gradually added, and further 80 g of the fine particles granulated above was dispersed and subjected to heating treatment at 90° C. for 2 hours. After cooling, this slurry was filtered under reduced pressure to recover a cake. This cake was subjected to making slurry again, by the addition of from 0.5 to 0.6 L of distilled water, and then filtering. This washing operation was repeated four times.

The recovered cake was dried overnight at 110° C. Weight after drying was 67.5 g.

(3) Re-Granulation

Into 150 mL of distilled water, 50 g of the acid treated fine particles obtained in this way was 150 mL of distilled water was gradually added and stirred. This slurry was subjected to spray granulation using a spray granulation apparatus (LT-8), manufactured by Ohkawara Kakoki Co., Ltd. Slurry properties and operation conditions are as follows.

Slurry properties: pH=5.7, and slurry viscosity=150 CP; operation conditions: Atomizer rotation number=10000 rpm, liquid supply amount=0.7 L/hr, entrance temperature=130° C., exit temperature=110° C., and cyclone pressure difference=80 mm $H_2O$.

As a result, 45 g of granulated fine particles were recovered. Average particle diameter thereof was 69.3 μm, and the shape was sphere, although the surface was granulated rough. Measurement of the shape revealed that particles having an M/L of equal to or larger than 0.8 and equal to or smaller than 1.0 occupied 92%. Crush strength was 3.6 MPa.

(4) Preparation of a Catalyst

The following operation was carried out under inert gas, using a solvent and a monomer after treatment of deoxidization and dehydration. A granulated product of the ion exchange layered silicate was dried at 200° C. for 2 hours under reduced pressure.

Into a 1-L glass flask equipped with a stirring blade, 10 g of the granulated particles obtained by the operations of the above (1) to (3) was introduced, and n-heptane, and further a (25 mmol) heptane solution of triisobutylaluminium were added, and stirred at room temperature. After 1 hour, the solution was sufficiently washed with heptane to adjust the slurry to 100 mL.

Then, into 0.30 mmol of (r)-dichloro[1,1'-dimethylsilylenebis{2-methyl-4-(4-chlorophenyl)-4H-azulenyl}]hafnium synthesized in advance according to a method described in JP-A-11-240909, 43 mL of toluene was added and stirred for 1 hour or longer, and subsequently, a mixed solution, prepared in advance by reaction with 1.5 mmol of triisobutylaluminum (2.13 mL of a heptane solution) at room temperature for 1 hour, was added to the granulated particle slurry and stirred for 1 hour.

Subsequently, into a 1.0-L stirring type autoclave sufficiently purged with nitrogen, 105 mL of the heptane was introduced and kept at 40° C.; and the slurry of granulated particles/complex prepared above was introduced therein. After the temperature was stabilized at 40° C., propylene was supplied at a rate of 10 g/hr, and the temperature was maintained. After 2 hours, supply of propylene was stopped, and the temperature was maintained for further 2 hours. The slurry of a pre-polymerization catalyst was recovered with a siphon, and about 100 mL of the supernatant was removed, and dried at 40° C. under reduced pressure. This operation provided the pre-polymerization catalyst containing 2.1 g of propylene per 1 g of the catalyst.

Catalyst Production Example 2

(1) Acid Treatment

Into a 5-L separable flask equipped with a stirring blade and a reflux apparatus, 1,700 g of pure water was charged, and 500 g of 98% concentrated sulfuric acid was dropped; and further 300 g of commercially available granulated montmorillonite (Benclay SL manufactured by Mizusawa Industrial Chemicals, Ltd., having an average particle diameter of 23.5 μm) was added and stirred; and subsequently subjected to reaction at 90° C. for 2 hours. This slurry was washed using an apparatus wherein an aspirator was connected to a Nutsche and a suction bottle.

The recovered cake was added with 900 mL of an aqueous solution of 325 g of lithium sulfate monohydrate to be subjected to a reaction at 90 for 2 hours. This slurry was washed using an apparatus wherein an aspirator was connected to a Nutsche and a suction bottle, till pH>4 was attained.

The cake thus recovered was dried overnight at 120° C. As a result, 270 g of a chemically processed substance was obtained.

(2) Preparation of a Catalyst

The following operation was carried out under inert gas, using a solvent and a monomer after treatment of deoxidization and dehydration. A granulated product of the ion exchange layered silicate was dried at 200° C. for 2 hours under reduced pressure.

Into a 1-L glass flask equipped with a stirring blade, 10.0 g of acid treated montmorillonite obtained by the above (1) was weighed, and 65 mL of n-heptane, and 35.4 mL of a (25 mmol) heptane solution of triisobutylaluminium were added, and stirred at room temperature. Subsequently, the solution was washed with heptane till a residual liquid ratio of 1/100, to finally adjust the slurry to 100 mL.

Then, into 0.30 mmol of (r)-dichloro[1,1'-dimethylsilylenebis{2-ethyl-4-(2-fluoro-4-biphenyl)-4H-azulenyl}] hafnium synthesized in advance according to a method described in JP-A-2000-95791, 43 mL of toluene was added and stirred for 1 hour or longer, and subsequently, a mixed solution, prepared in advance by reaction with 1.5 mmol of triisobutylaluminum (2.13 mL of a heptane solution) at room temperature for 1 hour, was added to the above slurry and stirred for 1 hour.

Subsequently, into a 1.0-L stirring type autoclave sufficiently purged with nitrogen, 105 mL of the heptane was introduced and kept at 40° C.; and the slurry of granulated particles/a complex prepared above was introduced therein. After the temperature was stabilized at 40° C., propylene was supplied at a rate of 10 g/hr, and the temperature was maintained. After 2 hours, supply of propylene was stopped, and the temperature was maintained for further 2 hours. The slurry of a pre-polymerization catalyst was recovered with a siphon, and about 100 mL of the supernatant was removed, and dried at 40° C. under reduced pressure. This operation provided the pre-polymerization catalyst containing 2.1 g of propylene per 1 g of the catalyst.

Catalyst Production Example 3

Into a SUS autoclave purged with nitrogen, 1050 mL of purified kerosene, 15 g of anhydrous $MgCl_2$, 36.3 g of absolute ethanol and 4.5 g of EMASOL 320 (manufactured by Kao Atlas Co., Ltd.) were charged, and subsequently this mixture was heated under stirring, and stirred under 800 rpm, at 120° C. for 30 minutes. This molten mixture was transferred to a 3-L flask equipped with a stirrer, wherein 1.5 L of purified kerosene cooled at −10° C. was charged in advance, using a Teflon (registered trademark) tube with an inner diameter of 5 mm while stirring in high speed. The product was filtered and sufficiently washed with hexane to yield an elementary substance. After suspending 15 g of the elementary substance into 300 ml of titanium tetrachloride, at room temperature, 2.6 mL of diisobutyl phthalate was added and the solution of the mixture was heated up to 120° C. After mixing under stirring at a temperature of 120° C. for 2 hours, a solid substance was filtered, which was suspended again in 300 ml of titanium tetrachloride. The suspension solution was mixed under stirring at 130° C. for 2 hours. After filtering the solid substance, it was sufficiently washed with purified hexane to yield a titanium-containing solid catalyst component.

Into a 15-L stainless reactor equipped with an inclined blade, after purging with nitrogen, as a saturated hydrocarbon solvent, 8.3 liter of "Crystol-52" having a kinematic viscosity at 40° C. of 7.3 centi-stokes, manufactured by Esso Sekiyu K.K; 525 mmol of triethylaluminum; 80 mmol of diisopropyldimethoxysilane; and 700 g of the solid catalyst component containing titanium obtained above were added at room temperature, and subsequently the solution was warmed up to 40° C. and subjected to a reaction for 7 hours under a propylene partial pressure of 0.15 MPa to yield a pre-polymerization catalyst (3.0 g of propylene was reacted per 1 g of the titanium-containing solid catalyst component).

Example 1

(1) The Former Step

Into a stirring type 3-L autoclave, after sufficiently purging with propylene, 2.76 mL of an n-heptane solution of triisobutylaluminum (2.02 mmol) was added, and 500 mL of hydrogen and subsequently 750 g of liquid propylene were introduced, and the solution was heated up to 65° C., which temperature was kept. The pre-polymerization catalyst prepared in Catalyst Production Example 1 was converted to slurry in n-heptane, and 25 mg (excluding mass of the pre-polymerization polymer) thereof, as a catalyst, was injected to initiate polymerization. Temperature inside the tank was kept at 65° C., and when 30 minutes passed after catalyst charging, residual monomers were purged and inner temperature was lowered to 40° C.

(2) The Latter Step

Then, 14 ml of hydrogen and 0.20 MPa of propylene, subsequently 1.80 MPa of ethylene were introduced, and inner temperature was raised to 80° C. Subsequently, mixed gas of propylene and ethylene prepared in advance was introduced, and while adjusting inner pressure to 2.0 MPa, so that monomer composition ratio did not change during polymerization, a polymerization reaction was controlled for 240 minutes. As a result, 471 g of a propylene block copolymer, without any adhesion to the reactor, the stirrer blade or the like, and with good powder form was obtained.

(3) Property of the Propylene Block Copolymer

The propylene block copolymer obtained above had, as a result of CFC-IR, a rubber content (CP content) of 77.7% by weight, an ethylene content in rubber (CP) of 81.8% by mole, and a weight average molecular weight of rubber (CP) part of 210,000. Appearance of a molded product was good, and gel was not observed substantially. Other analysis results and properties are summarized in Table 1.

Example 2

A propylene block copolymer was produced in the same manner as in Example 1, except that propylene introduced at the start of the latter step was changed to 0.64 MPa, ethylene to 1.36 MPa and polymerization time of the latter step to 180 minutes. As a result, 403 g of the propylene block copolymer with good particle property was obtained. Appearance of a molded product was good, and gel was not observed substantially. Analysis values and property values are summarized in Table 1.

Example 3

A propylene block copolymer was produced in the same manner as in Example 2, except that hydrogen was not introduced at the start of the latter step. As a result, 320 g of the propylene block copolymer with good particle property was obtained. Appearance of a molded product was good, and gel was not observed substantially. Analysis values and property values are summarized in Table 1.

Example 4

A propylene block copolymer was produced in the same manner as in Example 2, except that propylene introduced at the start of the latter step was changed to 0.3 MPa, and ethylene to 1.7 MPa. As a result, 300 g of the propylene block copolymer with good particle property was obtained. Appearance of a molded product was good, and gel was not observed substantially. Analysis values and property values are summarized in Table 1.

Example 5

A propylene block copolymer was produced in the same manner as in Example 1, except that propylene introduced at the start of the latter step was changed to 0.64 MPa, ethylene to 1.36 MPa and polymerization time of the latter step to 60 minutes. As a result, 264 g of the propylene block copolymer with good particle property was obtained. Appearance of a molded product was good, and gel was not observed substantially. Analysis values and property values are summarized in Table 1.

Example 6

A propylene block copolymer was produced in the same manner as in Example 2, except that propylene introduced at the start of the latter step was changed to 0.1 MPa, and ethylene to 1.9 MPa. As a result, 230 g of the propylene block copolymer with good particle property was obtained. Appearance of a molded product was good, and gel was not observed substantially. Analysis values and property values are summarized in Table 1.

Example 7

A propylene block copolymer was produced in the same manner as in Example 2, except that amount of hydrogen added at the start of the former step was changed to 700 mL. As a result, 398 g of the propylene block copolymer with good particle property was obtained. Appearance of a molded product was good, and gel was not observed substantially. Analysis values and property values are summarized in Table 1.

Example 8

A propylene block copolymer was produced in the same manner as in Example 1, except that ethanol was introduced so as to be 74 ml (0.8 molar ration relative to triisobutylaluminum introduced to the former step), as an activated hydrogen compound, to the polymer obtained in the former polymerization step, before entering the latter polymerization step. As a result, 403 g of the propylene block copolymer with good particle property was obtained. Results thereof are summarized in Table 1. Appearance of a molded product was good, and gel was not observed substantially.

Example 9

A propylene block copolymer was produced in the same manner as in Example 6, except that ethanol was introduced so as to be 74 mg (0.8 molar ration relative to triisobutylaluminum introduced to the former step), as an activated hydrogen compound, to the polymer obtained in the former polymerization step, before entering the latter polymerization step. Results thereof are summarized in Table 1. Appearance of a molded product was good, and gel was not observed substantially.

Example 10

A propylene block copolymer was produced in the same manner as in Example 2, except that 4.8 g of ethylene was introduced before introducing liquid propylene, in the former step. After completion of the former step, 10 g of the powder was taken out to be subjected to analysis. The polymer obtained in the former step had an ethylene content of 0.5% by weight and a melting point of 155.2° C. Results thereof are shown in Table 1. Appearance of a molded product was good, and gel was not observed substantially.

Comparative Example 1

A propylene block copolymer was produced in the same manner as in Example 2, except that polymerization time in the latter step was changed to 40 minutes. Analysis values and property values are summarized in Table 1. Gel was observed in a molded product, and appearance was poor.

Comparative Example 2

A propylene block copolymer was produced in the same manner as in Example 3, except that polymerization time in the latter step was changed to 60 minutes. Analysis values and property values are summarized in Table 1. Gel was observed in a molded product, and appearance was poor.

Comparative Example 3

A propylene block copolymer was produced in the same manner as in Example 2, except that amount of hydrogen added at the start of the latter step was changed to 21 mL and polymerization time to 40 minutes. Analysis values and property values are summarized in Table 1. Gel was observed in a molded product, and appearance was poor.

Comparative Example 4

Into a 50-L stainless reactor equipped with an inclined blade, after purging with nitrogen, 9 kg of liquefied propylene and 3.5 mole of hydrogen were added, and further 56.3 mmol of triethylaluminum, and 5.6 mmol of diisopropyldimethoxysilane were injected into the reactor with nitrogen gas, and the solution was warmed up to 40° C. When temperature inside the reactor was reached 40° C., 45 ml of the prepolymerization catalyst prepared in Catalyst Production Example 3 was charged, and warmed up to 65° C. After polymerization at a polymerization temperature of 65° C., under a pressure of 2.85 MPa for 60 minutes, unreacted liquefied propylene was purged from the reactor to discharge pressure down to atmospheric pressure.

Subsequently, after the addition of 0.6 mmol of hydrogen, copolymerization of ethylene and propylene was carried out in gas phase polymerization. Reaction conditions were as follows: a temperature of 60° C., a pressure of 0.69 MPa, and a gas composition in a gas phase of 0.23, as an ethylene/propylene molar ratio. After completion of the reaction, the unreacted mixed gas was purged to discharge pressure down to atmospheric pressure. The resultant polymer powder was purged with nitrogen to sufficiently remove the unreacted monomer. Analysis values and property values are summarized in Table 1. A large quantity of gel was observed in a molded product, and appearance was extremely poor.

TABLE 1

| | | | Example | | | | | | |
|---|---|---|---|---|---|---|---|---|---|
| | | | 1 | 2 | 3 | 4 | 5 | 6 | 7 |
| Polymerization | Catalyst | — | Metallocene | Metallocene | Metallocene | Metallocene | Metallocene | Metallocene | Metallocene |
| | Average particle diameter of powder after the latter step | μm | 1370 | 1650 | 1600 | 1680 | 1700 | 1680 | 1700 |

TABLE 1-continued

| | | | | | | | | |
|---|---|---|---|---|---|---|---|---|
| Composition of block copolymer | CP content | % by weight | 77.7 | 74.2 | 59.0 | 65.3 | 50.5 | 53.7 | 61.3 |
| | Ethylene content in CP | % by mole | 81.8 | 48.0 | 48.2 | 73.6 | 48.2 | 89.0 | 48.4 |
| | Weight average MW of CP part | *10000 | 21 | 22 | 42 | 24 | 25 | 24 | 22 |
| | Content of component with MWS 5000 | % by weight | 0.71 | 0.78 | 0.53 | 0.91 | 0.92 | 0.85 | 1.30 |
| Property of block copolymer | Melting point of PP | °C. | 157.3 | 157.2 | 157.9 | 157.4 | 157.3 | 157.2 | 157.8 |
| | Bulk density (polymer BD) | g/cm³ (g/cc) | 0.37 | 0.38 | 0.42 | 0.38 | 0.40 | 0.37 | 0.38 |
| | MFR | g/10 min (dg/min) | 38 | 41 | 32 | 46 | 43 | 50 | 93 |
| | Flexural modulus | Mpa | 290 | 310 | 500 | 460 | 620 | 690 | 470 |
| | Sharpy impact resistance | kJ/m² | NB | NB | NB | NB | 45 | NB | NB |
| | blocking property | — | ○ | ○ | ○ | ○ | ○ | ○ | ○ |

| | | | Example | | | Comparative Example | | | |
|---|---|---|---|---|---|---|---|---|---|
| | | | 8 | 9 | 10 | 1 | 2 | 3 | 4 |
| Polymerization | Catalyst | — | Metallocene | Metallocene | Metallocene | Metallocene | Metallocene | Metallocene | Ziegler |
| | Average particle diameter of powder after the latter step | μm | 1580 | 1550 | 1680 | 1450 | 1560 | 1570 | 1680 |
| Composition of block copolymer | CP content | % by weight | 75.2 | 52.0 | 73.9 | 40.3 | 43.2 | 50.7 | 40.0 |
| | Ethylene content in CP | % by mole | 80.5 | 87.0 | 48.0 | 47.8 | 73.3 | 48.2 | 51.0 |
| | Weight average MW of CP part | *10000 | 21 | 24 | 22 | 25 | 24 | 9 | 27 |
| | Content of component with MWS 5000 | % by weight | 0.70 | 0.83 | 0.78 | 0.80 | 0.79 | 1.60 | 2.30 |
| Property of block copolymer | Melting point of PP | °C. | 157.3 | 157.2 | 155.2 | 157.2 | 157.9 | 157.2 | 163.2 |
| | Bulk density (polymer BD) | g/cm³ (g/cc) | 0.41 | 0.42 | 0.38 | 0.40 | 0.39 | 0.35 | Not Measurable |
| | MFR | g/10 min (dg/min) | 35 | 47 | 41 | 47 | 45 | 47 | 20 |
| | Flexural modulus | Mpa | 310 | 700 | 250 | 910 | 920 | 620 | 570 |
| | Sharpy impact resistance | kJ/m² | NB | NB | NB | 15 | 13 | 25 | NB |
| | blocking property | — | ○ | ○ | ○ | ○ | ○ | Δ | x |

NB: non-break

Example 11

(1) The Former Step

Into a stirring type 3-L autoclave, after sufficiently purging with propylene, 2.76 mL of an n-heptane solution of triisobutylaluminum (2.02 mmol) was added, and 500 mL of hydrogen and subsequently 750 g of liquid propylene were introduced, and the solution was heated up to 65° C. and temperature thereof was kept. The pre-polymerization catalyst prepared in Catalyst Production Example 1 was converted to slurry in n-heptane, and 25 mg (excluding mass of the pre-polymerization polymer) thereof, as a catalyst, was injected to initiate polymerization. Temperature inside the tank was kept at 65° C., and when 15 minutes passed after catalyst charging, residual monomers were purged and inner temperature was lowered to 40° C.

(2) The Latter Step

Then, 14 ml of hydrogen and 0.88 MPa of propylene, subsequently 1.12 MPa of ethylene were introduced, and inner temperature was raised to 80° C. Subsequently, mixed gas of propylene and ethylene prepared in advance was introduced, and while adjusting inner pressure to 2.0 MPa, so that monomer composition ratio did not change during polymerization, a polymerization reaction was controlled for 50 minutes. As a result, 270 g of a propylene block copolymer, without any adhesion to the reactor, the stirrer blade or the like, and with good powder form was obtained.

(3) Property of the Propylene Block Copolymer

The propylene block copolymer obtained above had, as a result of CFC-IR, a rubber content (CP content) of 46.1% by weight, an ethylene content in rubber (CP) of 30.5% by mole, a polymer BD of 0.43 (g/cc), an MFR of 52 (dg/min), and a low molecular weight component amount (M<5000) of 0.85% by weight. In addition, average particle diameter of powders after completion of the former step was 800 μm. In addition, properties of a molded product are shown in Table 2. Appearance of a molded product was good, and gel was not observed substantially.

Example 12

A propylene block copolymer was produced in the same manner as in Example 11, except that polymerization time in the former step was changed to 30 minutes, and polymerization time in the latter step was changed to 180 minutes. As a result, rubber content (CP content) was 78.2% by weight, ethylene content in rubber (CP) was 31.1% by mole, polymer BD was 0.38 (g/cc), MFR was 38 (dg/min), and low molecular weight component amount (M<5000) was 0.75% by weight. In addition, average particle diameter of powders after completion of the former step was 1700 μm. In addition, properties of a molded product are shown in Table 2. Appearance of a molded product was good, and gel was not observed substantially.

Example 13

A propylene block copolymer was produced in the same manner as in Example 12, except that propylene introduced at the start of the latter step was changed to 0.6 MPa, and ethylene to 1.4 MPa. As a result, rubber content (CP content) was 61.3% by weight, ethylene content in rubber (CP) was 50.3% by mole, polymer BD was 0.38 (g/cc), MFR was 47 (dg/min), and low molecular weight component amount (M<5000) was 0.80% by weight. In addition, average particle diameter of powders after completion of the former step was 1600 μm. In addition, properties of a molded product are shown in Table 2. Appearance of a molded product was good, and gel was not observed substantially.

Example 14

A propylene block copolymer was produced in the same manner as in Example 12, except that propylene introduced at the start of the latter step was changed to 0.4 MPa, and ethylene to 1.6 MPa. As a result, rubber content (CP content) was 49.1% by weight, ethylene content in rubber (CP) was 70.3% by mole, polymer BD was 0.37 (g/cc), MFR was 47 (dg/min), and low molecular weight component amount (M<5000) was 0.79% by weight. In addition, average particle diameter of powders after completion of the former step was 1600 μm. In addition, properties of a molded product are shown in Table 2. Appearance of a molded product was good, and gel was not observed substantially.

Example 15

A propylene block copolymer was produced in the same manner as in Example 12, except that propylene introduced at the start of the latter step was changed to 0.1 MPa, and ethylene to 1.9 MPa. As a result, rubber content (CP content) was 67.7% by weight, ethylene content in rubber (CP) was 87.8% by mole, polymer BD was 0.37 (g/cc), MFR was 50 (dg/min), and low molecular weight component amount (M<5000) was 0.85% by weight. In addition, average particle diameter of powders after completion of the former step was 1700 μm. In addition, properties of a molded product are shown in Table 2. Appearance of a molded product was good, and gel was not observed substantially.

Example 16

A propylene block copolymer was produced in the same manner as in Example 12, except that propylene introduced at the start of the latter step was changed to 0.2 MPa, and ethylene to 1.8 MPa. As a result, rubber content (CP content) was 59.3% by weight, ethylene content in rubber (CP) was 47.3% by mole, polymer BD was 0.37 (g/cc), MFR was 41 (dg/min), and low molecular weight component amount (M<5000) was 0.78% by weight. In addition, average particle diameter of powders after completion of the former step was 1700 μm. In addition, properties of a molded product are shown in Table 2. Appearance of a molded product was good, and gel was not observed substantially.

Example 17

A propylene block copolymer was produced in the same manner as in Example 13, except that 18 g of ethylene was introduced before introducing liquid propylene in the former step. Analysis results of the resultant propylene block copolymer and properties of a molded product are shown in Table 2. Appearance of the molded product was good, and gel was not observed substantially.

After completion of the former step, residual monomers were purged, and then 10 g of the powder of the former step was taken out using, a siphon nozzle under nitrogen atmosphere, and subjected to analysis. As a result, the polymer obtained in the former step had an ethylene content of 2.0% by weight and a melting point of 143° C.

Example 18

A propylene block copolymer was produced in the same manner as in Example 12, except that ethanol was introduced so as to be 74 mg (0.8 molar ration relative to triisobutylaluminum introduced to the former step), as an activated hydrogen compound, to the polymer obtained in the former polymerization step, before entering the latter polymerization step. Results thereof are summarized in Table 2. Appearance of a molded product was good, and gel was not observed substantially.

Example 19

A propylene block copolymer was produced in the same manner as in Example 14, except that ethanol was introduced so as to be 74 mg (0.8 molar ration relative to triisobutylaluminum introduced to the former step), as an activated hydrogen compound, to the polymer obtained in the former polymerization step, before entering the latter polymerization step. Results thereof are summarized in Table 2. Appearance of a molded product was good, and gel was not observed substantially.

Example 20

After introducing 100 g of polypropylene powder into a 3-L stainless horizontal type reactor (L/D=3) for gas phase polymerization, equipped with a stirring blade, and purged with nitrogen, 2.76 mL of an n-heptane solution of triisobutylaluminum (2.02 mmol) was added under stirring, and 45 mg of the pre-polymerization catalyst prepared in Catalyst Production Example 1 was introduced. Then, 50 mL of hydrogen was added, and temperature of the reactor was heated up to 60° C., and propylene was supplied so as to keep a pressure of 2.0 MPa, to continue gas phase polymerization of propylene for 2 hours. After elapse of the polymerization time, supply of propylene was stopped. Subsequently, temperature of the reactor was cooled down to 25° C. while discharging unreacted propylene outside the system, then the polymer was taken out from the reactor while leaving about 100 g of polypropylene particles inside the reactor. Subsequently, the pre-polymerization catalyst, in the same amount as in the first stage polymerization, was introduced, and same operation as in the first stage polymerization of propylene was repeated, as the second stage polymerization of propylene. After the third stage homopolymerization of propylene, wherein the above operation was further repeated once, the polymer was taken out from the reactor while leaving about 150 g of polypropylene particles.

Subsequently, after raising temperature of the reactor to 80° C., 0.88 MPa of propylene, and 1.12 MPa of ethylene were introduced, to continue a polymerization reaction for 60 minutes while adjusting inner pressure to 2.0 MPa, so that monomer composition ratio did not change during polymerization. After elapse of the polymerization time, supply of the monomer was stopped, and temperature of the reactor was cooled down to 25° C. while discharging unreacted monomer outside the system. As a result, 305 g of a propylene block copolymer, without any adhesion to the reactor, the stirrer blade or the like, and with good powder form was obtained.

The propylene block copolymer obtained above had a rubber content (CP content) of 50.8% by weight, an ethylene content in rubber (CP) of 31.2% by mole, a polymer BD of 0.38 (g/cc), an MFR of 27 (dg/min), and a low molecular weight component amount (M<5000) of 0.95% by weight. In addition, average particle diameter of powders after completion of the former step was 1500 μm. In addition, properties of a molded product are shown in Table 2. Appearance of a molded product was good, and gel was not observed substantially.

Comparative Example 5

A propylene block copolymer was produced under same conditions as in Example 11, except that the catalyst used for polymerization was changed to the catalyst produced in Catalyst Production Example 2. As a result, 245 g of a propylene block copolymer was obtained, but different from Example 11, particles themselves were aggregated, and adhesion to the reactor and the stirrer was observed. From a result of CFC-IR, rubber content (CP content) was 46.3% by weight, ethylene content in rubber (CP) was 30.4% by mole, polymer BD was not measurable, MFR was 50 (dg/min), and low molecular weight component amount (M<5000) was 0.85% by weight. In addition, average particle diameter of powders after completion of the former step was 500 μm. In addition, properties of a molded product are shown in Table 2. Gel was observed in the molded product, and appearance was poor.

Comparative Example 6

Into a 50-L stainless reactor equipped with an inclined blade, after purging with nitrogen, 9 kg of liquefied propylene and 3.5 mole of hydrogen were added, and further 56.3 mmol of triethylaluminum, and 5.6 mmol of diisopropyldimethoxysilane were injected into the reactor with nitrogen gas, and the solution was warmed up to 40° C. When temperature inside the reactor was reached 40° C., 45 ml of the pre-polymerization catalyst prepared in Catalyst Production Example 3 was charged, and warmed up to 65° C. After polymerization at a polymerization temperature of 65° C., under a pressure of 2.85 MPa for 60 minutes, unreacted liquefied propylene was purged from the reactor to discharge pressure down to atmospheric pressure.

Subsequently, after the addition of 0.6 mmol of hydrogen, copolymerization of ethylene and propylene was carried out in gas phase polymerization. Reaction conditions were as follows: a temperature of 60° C., a pressure of 0.69 MPa, and a gas composition in a gas phase of 0.23, as an ethylene/propylene molar ratio. After completion of the reaction, the unreacted mixed gas was purged to discharge pressure down to atmospheric pressure. The resultant polymer powder was purged with nitrogen to sufficiently remove the unreacted monomer. In the resultant propylene block copolymer, particles themselves were aggregated, and adhesion to the reactor and the stirrer was observed. From a result of CFC-IR, rubber content (CP content) was 40.2% by weight, ethylene content in rubber (CP) was 51.5% by mole, polymer BD was not measurable, MFR was 20 (dg/min), and low molecular weight component amount (M<5000) was 3.4% by weight. In addition, average particle diameter of powders after completion of the former step was 1700 μm. In addition, properties of a molded product are shown in Table 2. A large quantity of gel was observed in the molded product, and appearance was extremely poor.

TABLE 2

| | | | Example | | | | | |
|---|---|---|---|---|---|---|---|---|
| | | | 11 | 12 | 13 | 14 | 15 | 16 |
| Polymerization | Catalyst | — | Metallocene | Metallocene | Metallocene | Metallocene | Metallocene | Metallocene |
| | Average particle diameter of powder after the latter step | μm | 800 | 1700 | 1600 | 1600 | 1700 | 1700 |
| Composition of block copolymer | CP content | % by weight | 46.1 | 78.2 | 61.3 | 70.3 | 67.7 | 59.3 |
| | Ethylene content in CP | % by mole | 30.5 | 31.1 | 50.3 | 49.1 | 87.8 | 47.3 |
| | Weight average MW of CP part | *10000 | 21 | 25 | 24 | 24 | 22 | 23 |
| | Content of component with MWS 5000 | % by weight | 0.85 | 0.75 | 0.80 | 0.79 | 0.85 | 0.78 |
| Property of block copolymer | Melting point of PP | ° C. | 157.6 | 157.8 | 157.4 | 157.3 | 157.4 | 157.8 |
| | Bulk density (polymer BD) | g/cm³ (g/cc) | 0.43 | 0.38 | 0.38 | 0.37 | 0.37 | 0.38 |
| | MFR | g/10 min (dg/min) | 52 | 38 | 47 | 47 | 50 | 41 |
| | Flexural modulus | Mpa | 590 | 340 | 480 | 330 | 430 | 380 |
| | Sharpy impact resistance | kJ/m² | NB | NB | NB | NB | NB | NB |
| | blocking property | — | — | ○ | ○ | ○ | ○ | ○ | ○ |

TABLE 2-continued

|  |  |  | Example | | | | Comparative Example | |
|---|---|---|---|---|---|---|---|---|
|  |  |  | 17 | 18 | 19 | 20 | 5 | 6 |
| Polymerization |  Catalyst | — | Metallocene | Metallocene | Metallocene | Metallocene | Metallocene | Ziegler |
|  | Average particle diameter of powder after the latter step | μm | 1800 | 1700 | 1600 | 1500 | 500 | 1700 |
| Composition of block copolymer | CP content | % by weight | 58.5 | 73.0 | 68.5 | 50.8 | 46.4 | 40.2 |
|  | Ethylene content in CP | % by mole | 48.2 | 30.7 | 47.0 | 31.2 | 30.4 | 51.5 |
|  | Weight average MW of CP part | *10000 | 24 | 24 | 22 | 21 | 24 | 28 |
|  | Content of component with MWS 5000 | % by weight | 0.95 | 0.76 | 0.78 | 0.95 | 0.85 | 3.40 |
| Property of block copolymer | Melting point of PP | °C. | 143.0 | 157.3 | 157.4 | 157.2 | 157.8 | 162.8 |
|  | Bulk density (polymer BD) | g/cm³ (g/cc) | 0.37 | 0.42 | 0.41 | 0.38 | Not Measurable | Not Measurable |
|  | MFR | g/10 min (dg/min) | 42 | 29 | 43 | 27 | 50 | 20 |
|  | Flexural modulus | Mpa | 380 | 320 | 310 | 420 | 590 | 570 |
|  | Sharpy impact resistance | kJ/m² | NB | NB | NB | NB | 15 | NB |
|  | blocking property | — | ○ | ○ | ○ | ○ | ○ | x |

NB: non-break

As is clear from Table 1, the propylene block copolymer of the present invention is a polymer excellent in flexibility, low temperature impact resistance and powder property (Examples 1 to 7). In addition, the propylene block copolymer of the present invention, wherein an activated hydrogen compound is added as an electron donating compound, before entering the latter polymerization step, is a polymer excellent in flexibility, low temperature impact resistance and powder property, as well as providing a molded product with good appearance, and without gel observed (Examples 8 and 9). On the other hand, excessively small CP content provides inferior flexibility (Comparative Examples 1 and 2); excessively low weight average molecular weight of the CP part provides inferior antiblocking property of a molded part (Comparative Example 3); and no use of a metallocene catalyst not only provides inferior antiblocking property of a molded part but also deteriorates fluidity of powder particles (Comparative Example 4).

In addition, from the result of Table 2, by comparison between Examples 11 to 20, and Comparative Example 5, in Comparative Example, wherein production is carried out by a process not satisfying a requisite, "production should be carried out so that average particle diameter of PP is equal to or larger than 700 μm", which is a specified item of a process for production of the present invention, polymer powder form in the propylene block copolymer produced, and impact resistance of a molded part thereof are inferior; on the other hand, in the propylene block copolymer composition according to the present invention, all of polymer powder form, flexural modulus, impact resistance and antiblocking property of a molded part thereof are good, and the propylene block copolymer composition, which provides a molded part excellent in flexibility or impact resistance balance, is obtained.

In addition, by comparison between Examples 11 to 20, and Comparative Example 6, in Comparative Example, wherein production is carried out by a process not satisfying a "Requisite (1): Content of CP in the propylene block copolymer is from 45 to 99% by weight", and "Requisite (4): Ratio of amount of a component with a molecular weight equal to or less than 5000 (M≦5000), by measurement with gel permeation chromatography (GPC), is equal to or less than 2.0% by weight of the total" which are specified items of a process for production of the present invention, polymer powder form in the propylene block copolymer produced, and impact resistance of a molded part thereof are inferior; on the other hand, in the propylene block copolymer composition according to the present invention, all of polymer powder form, flexural modulus, impact resistance and antiblocking property of a molded part thereof are good, and the propylene block copolymer composition, which provides a molded part excellent in flexibility or impact resistance balance, is obtained.

In addition, Examples 18 and 19 provide the propylene block copolymer obtained by a process satisfying a requisite, "An electron donating compound should be present", which is a specified item of a process for production of the present invention, and by the addition of an activated hydrogen compound, as the electron donating compound, the propylene block copolymer composition, which is good in all of polymer powder form, flexural modulus, impact resistance and antiblocking property of a molded part thereof, excellent in flexibility-impact resistance balance, along with good in appearance without observation of gel at all, is obtained.

The propylene block copolymer of the present invention has higher amount of a propylene-α-olefin copolymer as compared with a conventional copolymer, higher comonomer composition of the copolymer, and lower content of a low molecular weight component; and because it has excellent flexibility or impact resistance, good antiblocking property, less gel generation in molding, low coefficient of linear expansion, and good polymer powder form, industrial value thereof is extremely high. In addition, because a process for production of the present invention is capable of producing the propylene block copolymer stably and efficiently, similarly, industrial value thereof is extremely high.

What is claimed is:

1. A propylene block copolymer obtainable by a multi-step polymerization in the presence of a metallocene catalyst supported on a carrier comprising:

a former step for producing a propylene homopolymer component, or a propylene copolymer component (hereafter referred to as PP) composed of propylene and at least one kind of a comonomer selected from the group consisting of ethylene and a $C_{4-20}$ α-olefin, wherein content of said comonomer being equal to or less than 10% by weight; and a latter step for producing a copolymer component (hereafter referred to as CP) composed of propylene and at least one kind of a comonomer selected from the group consisting of ethylene and a $C_{4-20}$ α-olefin, characterized by satisfying the following requisites (1) to (4):

Requisite (1): Content of CP in the propylene block copolymer is from 45 to 99% by weight Requisite (2): Polymerization ratio of the comonomer in CP is from 30 to below 100% by mole Requisite (3): Weight average molecular weight of CP is from 100,000 to 2,000,000

Requisite (4): Ratio of amount of a component with a molecular weight of equal to or less than 5000 (M≦5000), by measurement with gel permeation chromatography (GPC), is equal to or less than 2.0% by weight of the total.

2. The propylene block copolymer according to claim 1, characterized in that bulk density (BD) is equal to or higher than $0.37 \text{ g/cm}^3$.

3. The propylene block copolymer according to claim 1, wherein the CP content is from 50 to 80% by weight.

4. The propylene block copolymer according to claim 1, wherein the ratio of the comonomer in CP is from 40 to 99% by mole.

5. The propylene block copolymer according to claim 1, wherein the weight average molecular weight of CP is from 200,000 to 1,200,000.

6. The propylene block copolymer according to claim 1, wherein the comonomer used in CP is ethylene.

7. The propylene block copolymer according to claim 1, wherein said PP is a propylene homopolymer component.

8. The propylene block copolymer according to claim 1, wherein melting point of PP is equal to or higher than 157° C.

9. A process for production of the propylene block copolymer according to claim 1, characterized in that:

the former step produces a propylene homopolymer component, or a propylene copolymer component (hereafter referred to as PP) composed of propylene and at least one kind of a comonomer selected from the group consisting of ethylene and a $C_{4-20}$ α-olefin, wherein content of said comonomer being equal to or less than 10% by weight, so that average particle diameter of said PP is equal to or larger than 700 μm; and subsequently the latter step produces, by gas phase polymerization, a copolymer component (hereafter referred to as CP) composed of propylene and at least one kind of a comonomer selected from the group consisting of ethylene and a $C_{4-20}$ α-olefin.

10. The process for production of the propylene block copolymer according to claim 9, characterized in that the former step is carried out at a temperature of from 30 to 120° C., under a pressure of from 0.1 to 6 MPa, while the latter step is carried out at a temperature of from 30 to 120° C., under a pressure of from 0.1 to 5 MPa.

11. The process for production of the propylene block copolymer according to claim 9, characterized in that, in the former step, PP is produced so that average particle diameter thereof is equal to or larger than 1 mm.

12. The process for production of the propylene block copolymer according to claim 9, characterized in that the former step is carried out by gas phase polymerization.

13. The process for production of the propylene block copolymer according to claim 9, characterized in that the latter step is carried out in the co-presence of an electron-donating compound.

14. The process for production of the propylene block copolymer according to claim 9, characterized in that the latter step is carried out in the co-presence of an organoaluminum compound in addition to an electron-donating compound, and amount of the electron-donating compound is in a range of from 0.001 to 1.0, as molar ratio, relative to an aluminum atom.

15. The process for production of the propylene block copolymer according to claim 9, characterized in that the latter step is carried out in a gas phase polymerization reactor process that is mechanically stirred.

16. The process for production of the propylene block copolymer according to claim 9, characterized in that said carrier is an inorganic compound carrier with a nearly spherical shape, and average particle diameter thereof is from 25 to 200 μm.

17. The process for production of the propylene block copolymer according to claim 16, characterized in that average crush strength of said inorganic compound based carrier is from 1 to 20 MPa.

18. The propylene block copolymer according to claim 2, wherein the CP content is from 50 to 80% by weight.

19. A process for production of the propylene block copolymer according to claim 2, characterized in that:

the former step produces a propylene homopolymer component, or a propylene copolymer component (hereafter referred to as PP) composed of propylene and at least one kind of a comonomer selected from the group consisting of ethylene and a $C_{4-20}$ α-olefin, wherein content of said comonomer being equal to or less than 10% by weight, so that average particle diameter of said PP is equal to or larger than 700 μm; and subsequently the latter step produces, by gas phase polymerization, a copolymer component (hereafter referred to as CP) composed of propylene and at least one kind of a comonomer selected from the group consisting of ethylene and a $C_{4-20}$ α-olefin.

20. The process for production of the propylene block copolymer according to claim 10, characterized in that, in the former step, PP is produced so that average particle diameter thereof is equal to or larger than 1 mm.

\* \* \* \* \*